US006754687B1

(12) United States Patent
Kurak, Jr. et al.

(10) Patent No.: US 6,754,687 B1
(45) Date of Patent: Jun. 22, 2004

(54) METHODS AND APPARATUS FOR EFFICIENT COSINE TRANSFORM IMPLEMENTATIONS

(75) Inventors: Charles W. Kurak, Jr., Durham, NC (US); Gerald G. Pechanek, Cary, NC (US)

(73) Assignee: PTS Corporation, San Jose, CA (US)

( * ) Notice: Subject to any disclaimer, the term of this patent is extended or adjusted under 35 U.S.C. 154(b) by 562 days.

(21) Appl. No.: 09/711,218

(22) Filed: Nov. 9, 2000

Related U.S. Application Data

(60) Provisional application No. 60/165,337, filed on Nov. 12, 1999.

(51) Int. Cl.[7] .............................................. G06F 17/14
(52) U.S. Cl. ........................................ 708/402; 707/10
(58) Field of Search ....................... 707/1, 10; 708/401, 708/402

(56) References Cited

U.S. PATENT DOCUMENTS

| | | | |
|---|---|---|---|
| 4,829,465 A | 5/1989 | Knauer | 364/725 |
| 5,285,402 A | 2/1994 | Keith | 364/725 |
| 5,546,336 A | 8/1996 | Pechanek et al. | 364/725 |
| 5,854,757 A | 12/1998 | Dierke | 364/725.03 |
| 5,870,497 A | 2/1999 | Galbi et al. | 382/232 |
| 5,978,508 A | 11/1999 | Tsuboi | 382/234 |

FOREIGN PATENT DOCUMENTS

| | | | |
|---|---|---|---|
| EP | 0-720103 A1 | 7/1996 | G05F/17/14 |

OTHER PUBLICATIONS

Pechanek, G.G. et al., "M.f.a.s.t.: a Single Chip Highly Parallel Image Processing Architecture", Proceedings International Conference on Image Processing, Oct. 1995, vol. 1, pp. 69–72.

Wang, C–L et al. "Highly Parallel VLSI Architectures for the 2–D DCT and IDCT Computations", IEEE Region 10's Ninth Annual International Conference, Aug. 1994, Col. 1, pp. 295–299.

G.G. Pechanek, C.W. Kurak, C.J. Glossner, C.H.L. Moller, and S.J. Walsh, "M.f.a.s.t.: a Highly Parallel Single Chip DSP with a 2D IDCT Example", The Sixth International Conference on Signal Processing Applications & Technology, Boston, MA, Oct. 24–26, 1995.

CAS Standards Committee, "IEEE Standard Specifications for the Implementations of 8×8 Inverse Discrete Cosine Transform", IEEE Std., Mar. 18, 1991, pp. 1–13.

*Primary Examiner*—Jack Choules
(74) *Attorney, Agent, or Firm*—Priest & Goldstein, PLLC

(57) ABSTRACT

Many video processing applications, such as the decoding and encoding standards promulgated by the moving picture experts group (MPEG), are time constrained applications with multiple complex compute intensive algorithms such as the two-dimensional 8×8 IDCT. In addition, for encoding applications, cost, performance, and programming flexibility for algorithm optimizations are important design requirements. Consequently, it is of great advantage to meeting performance requirements to have a programmable processor that can achieve extremely high performance on the 2D 8×8 IDCT function. The ManArray 2×2 processor is able to process the 2D 8×8 IDCT in 34-cycles and meet the IEEE standard 1180-1990 for precision of the IDCT. A unique distributed 2D 8×8 IDCT process is presented along with the unique data placement supporting the high performance algorithm. In addition, a scalable 2D 8×8 IDCT algorithm that is operable on a 1×0, 1×1, 1×2, 2×2, 2×3, and further arrays of greater numbers of processors is presented that minimizes the VIM memory size by reuse of VLIWs and streamlines further application processing by having the IDCT results output in a standard row-major order. The techniques are applicable to cosine transforms more generally, such as discrete cosine transforms (DCTs).

43 Claims, 48 Drawing Sheets

| M0 f0,0 | M1 f0,1 | M2 f0,2 | M3 f0,3 | M4 f0,4 | M5 f0,5 | M6 f0,6 | M7 f0,7 |
|---|---|---|---|---|---|---|---|
| M8 f1,0 | M9 f1,1 | M10 f1,2 | M11 f1,3 | M12 f1,4 | M13 f1,5 | M14 f1,6 | M15 f1,7 |
| M16 f2,0 | M17 f2,1 | M18 f2,2 | M19 f2,3 | M20 f2,4 | M21 f2,5 | M22 f2,6 | M23 f2,7 |
| M24 f3,0 | M25 f3,1 | M26 f3,2 | M27 f3,3 | M28 f3,4 | M29 f3,5 | M30 f3,6 | M31 f3,7 |
| M32 f4,0 | M33 f4,1 | M34 f4,2 | M35 f4,3 | M36 f4,4 | M37 f4,5 | M38 f4,6 | M39 f4,7 |
| M40 f5,0 | M41 f5,1 | M42 f5,2 | M43 f5,3 | M44 f5,4 | M45 f5,5 | M46 f5,6 | M47 f5,7 |
| M48 f6,0 | M49 f6,1 | M50 f6,2 | M51 f6,3 | M52 f6,4 | M53 f6,5 | M54 f6,6 | M55 f6,7 |
| M56 f7,0 | M57 f7,1 | M58 f7,2 | M59 f7,3 | M60 f7,4 | M61 f7,5 | M62 f7,6 | M63 f7,7 |

FIG. 3B

| M0 f0,0 | M2 f0,2 | M4 f0,4 | M6 f0,6 | M1 f0,1 | M3 f0,3 | M5 f0,5 | M7 f0,7 |
|---|---|---|---|---|---|---|---|
| M16 f2,0 | M18 f2,2 | M20 f2,4 | M22 f2,6 | M17 f2,1 | M19 f2,3 | M21 f2,5 | M23 f2,7 |
| M32 f4,0 | M34 f4,2 | M36 f4,4 | M38 f4,6 | M33 f4,1 | M35 f4,3 | M37 f4,5 | M39 f4,7 |
| M48 f6,0 | M50 f6,2 | M52 f6,4 | M54 f6,6 | M49 f6,1 | M51 f6,3 | M53 f6,5 | M55 f6,7 |
| M8 f1,0 | M10 f1,2 | M12 f1,4 | M14 f1,6 | M9 f1,1 | M11 f1,3 | M13 f1,5 | M15 f1,7 |
| M24 f3,0 | M26 f3,2 | M28 f3,4 | M30 f3,6 | M25 f3,1 | M27 f3,3 | M29 f3,5 | M31 f3,7 |
| M40 f5,0 | M42 f5,2 | M44 f5,4 | M46 f5,6 | M41 f5,1 | M43 f5,3 | M45 f5,5 | M47 f5,7 |
| M56 f7,0 | M58 f7,2 | M60 f7,4 | M62 f7,6 | M57 f7,1 | M59 f7,3 | M61 f7,5 | M63 f7,7 |

| M0 f0,0 | M7 f0,7 | | M2 f0,2 | M5 f0,5 | | M4 f0,4 | M3 f0,3 | | M6 f0,6 | M1 f0,1 |
|---|---|---|---|---|---|---|---|---|---|---|
| M16 f2,0 | M23 f2,7 | | M18 f2,2 | M21 f2,5 | | M20 f2,4 | M19 f2,3 | | M22 f2,6 | M17 f2,1 |
| M32 f4,0 | M39 f4,7 | | M34 f4,2 | M37 f4,5 | | M36 f4,4 | M35 f4,3 | | M38 f4,6 | M33 f4,1 |
| M48 f6,0 | M55 f6,7 | | M50 f6,2 | M53 f6,5 | | M52 f6,4 | M51 f6,3 | | M54 f6,6 | M49 f6,1 |

| M8 f1,0 | M15 f1,7 | | M10 f1,2 | M13 f1,5 | | M12 f1,4 | M11 f1,3 | | M14 f1,6 | M9 f1,1 |
|---|---|---|---|---|---|---|---|---|---|---|
| M24 f3,0 | M31 f3,7 | | M26 f3,2 | M29 f3,5 | | M28 f3,4 | M27 f3,3 | | M30 f3,6 | M25 f3,1 |
| M40 f5,0 | M47 f5,7 | | M42 f5,2 | M45 f5,5 | | M44 f5,4 | M43 f5,3 | | M46 f5,6 | M41 f5,1 |
| M56 f7,0 | M63 f7,7 | | M58 f7,2 | M61 f7,5 | | M60 f7,4 | M59 f7,3 | | M62 f7,6 | M57 f7,1 |

FIG. 4

| | H1 | H0 | | H1 | H0 | |
|---|---|---|---|---|---|---|
| R1 | f0,0 0 | f0,2 2 | | f2,0 16 | f2,2 18 | R0 |
| R3 | f7,0 56 | f7,2 58 | | f5,0 40 | f5,2 42 | R2 |
| R5 | f0,7 7 | f0,5 5 | | f2,7 23 | f2,5 21 | R4 |
| R7 | f7,7 63 | f7,5 61 | | f5,7 47 | f5,5 45 | R6 |
| R9 | | | | | | R8 |
| R11 | | | | | | R10 |
| R13 | | | | | | R12 |
| R15 | | | | | | R14 |
| R17 | | | | | | R16 |
| R19 | | | | | | R18 |
| R21 | | | | | | R20 |
| R23 | | | | | | R22 |
| R25 | | | | | | R24 |
| R27 | | | | | | R26 |
| R29 | | | | | | R28 |
| R31 | | | | | | R30 |

PE0

| | H1 | H0 | | H1 | H0 | |
|---|---|---|---|---|---|---|
| R1 | f0,4 4 | f0,6 6 | | f2,4 20 | f2,6 22 | R0 |
| R3 | f7,4 60 | f7,6 62 | | f5,4 44 | f5,6 46 | R2 |
| R5 | f0,3 3 | f0,1 1 | | f2,3 19 | f2,1 17 | R4 |
| R7 | f7,3 59 | f7,1 57 | | f5,3 43 | f5,1 41 | R6 |
| R9 | | | | | | R8 |
| R11 | | | | | | R10 |
| R13 | | | | | | R12 |
| R15 | | | | | | R14 |
| R17 | | | | | | R16 |
| R19 | | | | | | R18 |
| R21 | | | | | | R20 |
| R23 | | | | | | R22 |
| R25 | | | | | | R24 |
| R27 | | | | | | R26 |
| R29 | | | | | | R28 |
| R31 | | | | | | R30 |

PE1

| | H1 | H0 | | H1 | H0 | |
|---|---|---|---|---|---|---|
| R1 | f4,0 32 | f4,2 34 | | f6,0 48 | f6,2 50 | R0 |
| R3 | f3,0 24 | f3,2 26 | | f1,0 8 | f1,2 10 | R2 |
| R5 | f4,7 39 | f4,5 37 | | f6,7 55 | f6,5 53 | R4 |
| R7 | f3,7 31 | f3,5 29 | | f1,7 15 | f1,5 13 | R6 |
| R9 | | | | | | R8 |
| R11 | | | | | | R10 |
| R13 | | | | | | R12 |
| R15 | | | | | | R14 |
| R17 | | | | | | R16 |
| R19 | | | | | | R18 |
| R21 | | | | | | R20 |
| R23 | | | | | | R22 |
| R25 | | | | | | R24 |
| R27 | | | | | | R26 |
| R29 | | | | | | R28 |
| R31 | | | | | | R30 |

PE2

| | H1 | H0 | | H1 | H0 | |
|---|---|---|---|---|---|---|
| R1 | f4,4 36 | f4,6 38 | | f6,4 52 | f6,6 54 | R0 |
| R3 | f3,4 28 | f3,6 30 | | f1,4 12 | f1,6 14 | R2 |
| R5 | f4,3 35 | f4,1 33 | | f6,3 51 | f6,1 49 | R4 |
| R7 | f3,3 27 | f3,1 25 | | f1,3 11 | f1,1 9 | R6 |
| R9 | | | | | | R8 |
| R11 | | | | | | R10 |
| R13 | | | | | | R12 |
| R15 | | | | | | R14 |
| R17 | | | | | | R16 |
| R19 | | | | | | R18 |
| R21 | | | | | | R20 |
| R23 | | | | | | R22 |
| R25 | | | | | | R24 |
| R27 | | | | | | R26 |
| R29 | | | | | | R28 |
| R31 | | | | | | R30 |

XV-EXECUTE VLIW
ENCODING
— 500

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | S/P | CtrlOp | | | | | | VX | UAF | RFI | | CE2 | | 0 | 0 | 0 | SU | LU | ALU | MAU | DSU | Vb | 0 | VimOffs | | | | | | | |

Syntax/Operation

| Instruction | Operands | Operation |
|---|---|---|
| XV.[SP] | V[01], VIMOFFS, E={SLAMD}, F=[AMDN], R=[01N] | Execute (V[01]+VIMOFFS)[SU] if (E=S)<br>Execute (V[01]+VIMOFFS)[LU] if (E=L)<br>Execute (V[01]+VIMOFFS)[ALU] if (E=A)<br>Execute (V[01]+VIMOFFS)[MAU] if (E=M)<br>Execute (V[01]+VIMOFFS)[DSU] if (E=D)<br><br>(V[01]+VIMOFFS)[UAF] ← ALU if (F= or F=A)<br>(V[01]+VIMOFFS)[UAF] ← MAU if (F=M)<br>(V[01]+VIMOFFS)[UAF] ← DSU if (F=D)<br>(V[01]+VIMOFFS)[UAF] ← None if (F=N) |
| [TF].XV.[SP] | V[01], VIMOFFS, E={SLAMD}, F=N, R=[01N] | Do operation only if T/F condition is satisfied in F0 |

Arithmetic Flags Affected
Condition Flags are set by the individual simplex instruction in the slot specified by the setting of 'F=' parameter from the original LV instruction or as overridden by a 'F=[AMD]' parameter in the XV instruction. Condition flags are not affected when 'F=N' or when XV is conditionally executed via [T.] or [F.].
Cycles: 1

FIG. 6A

SUM2P-SUM OF 2 PRODUCTS

ENCODING — 600

| 31 30 29 | 28 27 | 26 25 24 23 22 21 | 20 19 18 17 16 | 15 14 13 12 11 | 10 9 8 7 6 | 5 4 3 | 2 1 0 |
|---|---|---|---|---|---|---|---|
| Group | S/P | Unit | MAUopcode | Rt | Rx | Ry | 0 | CE2 | SumpExt |
| | | | | Rte | 0 | Rxe | 0 | Rye | 0 | | |

620 Syntax/Operation

| Instruction | Operands | Operation | ACF |
|---|---|---|---|
| | | Dual Halfwords | |
| SUM2P.[SP]M.2[SU]H | Rt, Rx, Ry | Rt ← (Rx.H1 * Ry.H1) + (Rx.H0 * Ry.H0) | None |
| [TF].SUM2P.[SP]M.2[SU]H | Rt, Rx, Ry | Do operation only if T/F condition is satisfied in F0 | None |
| | | Quad Halfwords | |
| SUM2P.[SP]M.4[SU]H | Rte, Rxe, Rye | Rto ← (Rxo.H1 * Ryo.H1) + (Rxo.H0 * Ryo.H0)<br>Rte ← (Rxe.H1 * Rye.H1) + (Rxe.H0 * Rye.H0) | None |
| [TF].SUM2P.[SP]M.4[SU]H | Rte, Rxe, Rye | Do operation only if T/F condition is satisfied in F0 | None |

Arithmetic Scalar Flags Affected (on least significant operation)
C = 1 if a carry occurs on the addition, 0 otherwise
N = MSB of result
V = 1 if an overflow occurs on the condition, 0 otherwise
Z = 1 if result is zero, 0 otherwise
NOTE: The ASFs are set as above for both signed and unsigned operations.
Cycles: 2

FIG. 7A

SUM2PA-SUM OF 2 PRODUCTS ACCUMULATE

ENCODING
700

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | | MAUopcode | | | | | Rt | | | | | Rx | | | | | Ry | | | | | 0 | CE2 | | SumpExt | | |
| | | | | | | | | | | | Rte | | | | 0 | Rxe | | | | 0 | Rye | | | | 0 | | | | | | |

720
Syntax/Operation

| Instruction | Operands | Operation | ACF |
|---|---|---|---|
| | | | Dual Halfwords |
| SUM2PA.[SP]M.2[SU]H | Rt, Rx, Ry | Rt ← Rt + (Rx.H1 * Ry.H1) + (Rx.H0 * Ry.H0) | None |
| [TF].SUM2PA.[SP]M.2[SU]H | Rt, Rx, Ry | Do operation only if T/F condition is satisfied in F0 | None |
| | | | Quad Halfwords |
| SUM2PA.[SP]M.4[SU]H | Rte, Rxe, Rye | Rto ← Rto + (Rxo.H1 * Ryo.H1) + (Rxo.H0 * Ryo.H0)<br>Rte ← Rte + (Rxe.H1 * Rye.H1) + (Rxe.H0 * Rye.H0) | None |
| [TF].SUM2PA.[SP]M.4[SU]H | Rte, Rxe, Rye | Do operation only if T/F condition is satisfied in F0 | None |

Arithmetic Scalar Flags Affected (on least significant operation)
C = 1 if a carry occurs on the add with Rt, 0 otherwise
N = MSB of result
V = 1 if an overflow occurs on the add with Rt, 0 otherwise
Z = 1 if result is zero, 0 otherwise
NOTE: The ASFs are set as above for both signed and unsigned operations.
Cycles: 2

FIG. 8A

BFLYS-BUTTERFLY WITH SATURATE

ENCODING
— 800

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | UNIT | | | ALUopcode / MAUopcode | | | | | Rte | | | | 0 | Rx / Rxe | | | | | | | | Ry / Rye | | | | 0 | CE2 | Hx | Hy | W/H |

Syntax/Operation

| Instruction | Operands | Operation | ACF |
|---|---|---|---|
| | | | Dual Words |
| BFLYS.[SP][AM].2[SU]W | Rte, Rxe, Rye | Rto ← Rx + Ry<br>Rte ← Rx - Ry | None |
| [TF].BFLYS.[SP][AM].2[SU]W | Rte, Rx, Ry | Do operation only if T/F condition is satisfied in ACFs | None |
| | | | Quad Halfwords |
| BFLYS.[SP][AM].4[SU]H | Rte, RxeHx, RyeHy | Rto.H1 ← Rxo.Hx + Ryo.Hy<br>Rto.H0 ← Rxo.Hx - Ryo.Hy<br>Rte.H1 ← Rxe.Hx + Rye.Hy<br>Rte.H0 ← Rxe.Hx - Rye.Hy<br>(Hx and Hy refer to register halfwords H0 or H1) | None |
| [TF].BFLYS.[SP][AM].4H[SU]H | Rte, RxeHx, RyeHy | Do operation only if T/F condition is satisfied in ACFs | None |

Arithmetic Scalar Flags Affected (on least significant operation)
C = 1 if a carry occurs, 0 otherwise
N = MSB of result
V = 1 if an overflow occurs, 0 otherwise
Z = 1 if result is zero, 0 otherwise
NOTE: The ASFs are set as above for both signed and unsigned operations.
Cycles: 1

ADD - ADD ENCODING

FIG. 9A — 900

| 31 30 | 29 | 28 27 26 | 25 24 23 22 21 | 20 19 18 17 16 | 15 14 13 12 11 | 10 9 8 7 6 | 5 4 | 3 2 | 1 0 |
|---|---|---|---|---|---|---|---|---|---|
| Group | S/P | UNIT | ALUopcode / MAUopcode | Rt / Rte | Rx / 0 Rxe | Ry / Rye 0 | 0 CE2 | | DPack |

FIG. 9B — 910

Syntax/Operation

| Instruction | Operands | Operation | ACF |
|---|---|---|---|
| | | | Doubleword |
| ADD.[SP][AM].1D | Rte, Rxe, Rye | Rto\|Rte ← Rxo\|Rxe + Ryo\|Rye | None |
| [TF].ADD.[SP][AM].1D | Rte, Rxe, Rye | Do operation only if T/F condition is satisfied in F0 | None |
| | | | Word |
| ADD.[SP][AM].1W | Rt, Rx, Ry | Rt ← Rx, Ry | None |
| [TF].ADD.[SP][AM].1W | Rt, Rx, Ry | Do operation only if T/F condition is satisfied in F0 | None |
| | | | Dualwords |
| ADD.[SP][AM].2W | Rte, Rxe, Rye | Rto ← Rxo + Ryo<br>Rte ← Rxe + Rye | None |
| [TF].ADD.[SP][AM].2W | Rte, Rxe, Rye | Do operation only if T/F condition is satisfied in F0 | None |
| | | | Dual Halfwords |
| ADD.[SP][AM].2H | Rt, Rx, Ry | Rt.H1 ← Rx.H1 + Ry.H1<br>Rt.H0 ← Rx.H0 + Ry.H0 | None |
| [TF].ADD.[SP][AM].2H | Rt, Rx, Ry | Do operation only if T/F condition is satisfied in F0 | None |
| | | | Quad Halfwords |
| ADD.[SP][AM].4H | Rte, Rxe, Rye | Rto.H1 ← Rxo.H1 + Ryo.H1<br>Rto.H0 ← Rxo.H0 + Ryo.H0<br>Rte.H1 ← Rxe.H1 + Rye.H1<br>Rte.H0 ← Rxe.H0 + Rye.H0 | None |
| [TF].ADD.[SP][AM].4H | Rte, Rxe, Rye | Do operation only if T/F condition is satisfied in F0 | None |
| | | | Quad Bytes |
| ADD.[SP][AM].4B | Rt, Rx, Ry | Rt.B3 ← Rx.B3 + Ry.B3<br>Rt.B2 ← Rx.B2 + Ry.B2<br>Rt.B1 ← Rx.B1 + Ry.B1<br>Rt.B0 ← Rx.B0 + Ry.B0 | None |
| [TF].ADD.[SP][AM].4B | Rt, Rx, Ry | Do operation only if T/F condition is satisfied in F0 | None |
| | | | Octal Bytes |
| ADD.[SP][AM].8B | Rte, Rxe, Rye | Rto.B3 ← Rxo.B3 + Ryo.B3<br>Rto.B2 ← Rxo.B2 + Ryo.B2<br>Rto.B1 ← Rxo.B1 + Ryo.B1<br>Rto.B0 ← Rxo.B0 + Ryo.B0<br>Rte.B3 ← Rxe.B3 + Rye.B3<br>Rte.B2 ← Rxe.B2 + Rye.B2<br>Rte.B1 ← Rxe.B1 + Rye.B1<br>Rte.B0 ← Rxe.B0 + Rye.B0 | None |
| [TF].ADD.[SP][AM].8B | Rte, Rxe, Rye | Do operation only if T/F condition is satisfied in F0 | None |

Arithmetic Scalar Flags Affected (on least significant operation)
C = 1 if a carry occurs, 0 otherwise (This bit is meaningful for unsigned operations)
N = MSB of result
V = 1 if an overflow occurs, 0 otherwise (This bit is meaningful for signed operations)
Z = 1 if result is zero, 0 otherwise
Cycles: 1

FIG. 10A

PERM-PERMUTE
ENCODING — 1000

| 31 30 29 | 28 | 27 26 25 24 23 22 21 | 20 19 18 17 16 | 15 14 13 12 11 | 10 9 8 7 | 6 | 5 4 3 2 | 1 0 |
|---|---|---|---|---|---|---|---|---|
| Group | S/P | Unit DSUopcode | Rt / Rte (bit 16 = 0) | Rxe | 0 Ry | | PermExt 0 | CE2 |

FIG. 10B

Syntax/Operation — 1010

| Instruction | Operands | Operation | ACF |
|---|---|---|---|
| | | | Quad Bytes |
| PERM.[SP]D.4B | Rt, Rxe, Ry | Rt.B3 ← Rxo\|\|Rxe.B(Ry[15:12])<br>Rt.B2 ← Rxo\|\|Rxe.B(Ry[11:8])<br>Rt.B1 ← Rxo\|\|Rxe.B(Ry[7:4])<br>Rt.B0 ← Rxo\|\|Rxe.B(Ry[3:0]) | None |
| [TF].PERM.[SP]D.4B | Rt, Rxe, Ry | Do operation only if T/F condition is satisfied in F0. | None |
| | | | Octal Bytes |
| PERM.[SP]D.8B | Rte, Rxe, Ry | Rto.B3 ← Rxo\|\|Rxe.B(Ry[31:28])<br>Rto.B2 ← Rxo\|\|Rxe.B(Ry[27:24])<br>Rto.B1 ← Rxo\|\|Rxe.B(Ry[23:20])<br>Rto.B0 ← Rxo\|\|Rxe.B(Ry[19:16])<br>Rte.B3 ← Rxo\|\|Rxe.B(Ry[15:12])<br>Rte.B2 ← Rxo\|\|Rxe.B(Ry[11:8])<br>Rte.B1 ← Rxo\|\|Rxe.B(Ry[7:4])<br>Rte.B0 ← Rxo\|\|Rxe.B(Ry[3:0]) | None |
| [TF].PERM.[SP]D.8B | Rte, Rxe, Ry | Do operation only if T/F condition is satisfied in F0. | None |

| 4 bit index | Output |
|---|---|
| 0000-0111 | Byte 0-Byte 7 |
| 1000-1111 | Fill the byte with the MSB of byte 0-7 |

Arithmetic Scalar Flags Affected
C = Not Affected
N = Not Affected
V = Not Affected
Z = Not Affected
Cycles: 1 n3-n0 are 4-bit (nibble) values in the range 0..15. Values in the range 0..7 specify a byte to copy from Rxo||Rxe to Rt. Ry (above) shows an example permute control word.

n3-n0 are 4-bit (nibble) values in the range 0..15. Values in the range 8..15 specify an MSB to be copied from Rxo||Rxe, and replicated in Rt. Ry (above) shows an example permute control word.

FIG. 11A

PEXCHG-PE TO PE EXCHANGE

ENCODING 1100

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | Unit | | | DSUopcode | | | | | Rt | | | | | Rx | | | | | PeXchgCSctrl | | | | | | | | CE3 | | |

Syntax/Operation

| Instruction | Operands | Operation | ACF |
|---|---|---|---|
| | | | Word |
| PEXCHG.PD.W | Rt, Rx, PeXchgCSctrl | Do operation below but do not affect ACFs | None |
| PEXCHG[NZ].PD.W | Rt, Rx, PeXchgCSctrl | PEPID: Rt ← Input port.<br>PEPID: Rx → Output port. | F0 |
| [TF].PEXCHG.PD.W | Rt, Rx, PeXchgCSctrl | Do operation only if T/F condition is satisfied in F0. | None |

Arithmetic Flags Affected
C = Not Affected
N = MSB of result
V = Not Affected
Z = 1 if a zero result is generated, 0 otherwise
Cycles: 1

FIG. 11C

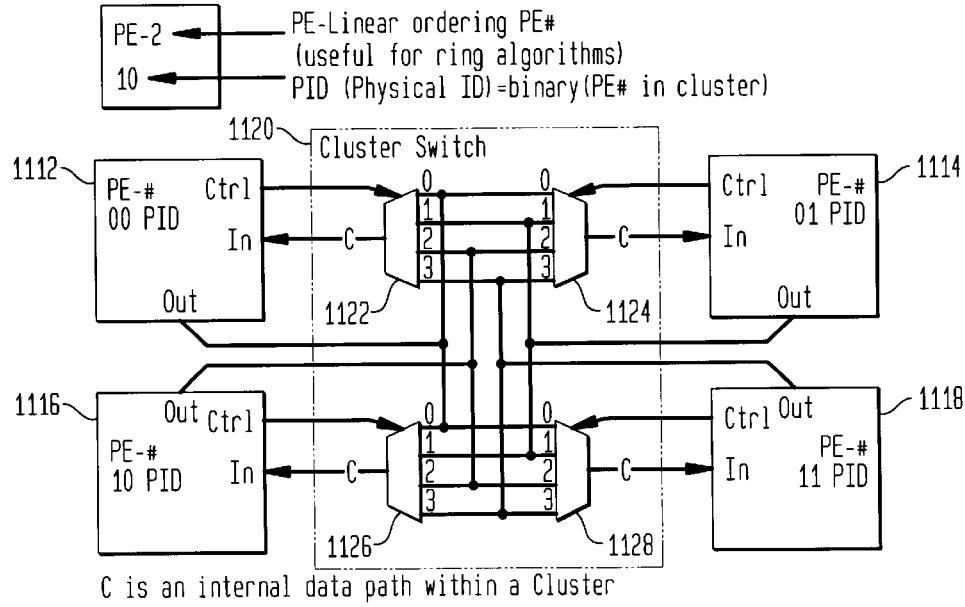

C is an internal data path within a Cluster

Key to PEXCHG 2x2 Operation Table

| Target PE → | 0 | | 1 | | 2 | | 3 | |
|---|---|---|---|---|---|---|---|---|
| PeXchgCSctrl | Src PE | Mux ctrl | Src PE | Mux ctrl | Src PE | Mux ctrl | Src PE | Mux ctrl |
| 2x2_SW | | | | | | | 3 | C,3 | 2 | C,2 |
| 2x2_SW | | | | | | | | C,0 | 1 | C,1 |
| 2x2_SW | | | | | | | | C,1 | 0 | C,0 |
| TRANSPOSE | 0 | C,0 | 2 | C,2 | 1 | C,1 | 3 | C,3 |
| DIAGONAL | 3 | C,3 | 1 | C,1 | 2 | C,2 | 0 | C,0 |
| SELF | 0 | C,0 | 1 | C,1 | 2 | C,2 | 3 | C,3 |
| 2x2_PE0 | 0 | C,0 | 0 | C,0 | 0 | C,0 | 0 | C,0 |
| 2x2_PE1 | 1 | C,1 | 1 | C,1 | 1 | C,1 | 1 | C,1 |
| 2x2_PE2 | 2 | C,2 | 2 | C,2 | 2 | C,2 | 2 | C,2 |
| 2x2_PE3 | 3 | C,3 | 3 | C,3 | 3 | C,3 | 3 | C,3 |
| 2x2_RING1F | 2 | C,2 | 0 | C,0 | 3 | C,3 | 1 | C,1 |
| 2x2_RING1R | 1 | C,1 | 3 | C,3 | 0 | C,0 | 2 | C,2 |
| 2x2_RING2F | 3 | C,3 | 0 | C,0 | 1 | C,1 | 2 | C,2 |
| 2x2_RING2R | 1 | C,1 | 2 | C,2 | 3 | C,3 | 0 | C,0 |

*SIMD operations: Target PE (here 0) receiving from the source PE (here 3)*

1140

F=Forward
R=Reverse

FIG. 11E

PEXCHG 1x1 Operation Table — 1160

| Target PE → | 0 | |
|---|---|---|
| PeXchgCSctrl | Src PE | Mux ctrl |
| SELF | 0 | C,0 |

FIG. 11F

PEXCHG 1x2 Operation Table — 1170

| Target PE → | 0 | | 1 | |
|---|---|---|---|---|
| PeXchgCSctrl | Src PE | Mux ctrl | Src PE | Mux ctrl |
| 1x2_SWP0 | 1 | C,1 | 0 | C,0 |
| SELF | 0 | C,0 | 1 | C,1 |
| 1x2_PE0 | 0 | C,0 | 0 | C,0 |
| 1x2_PE1 | 1 | C,1 | 1 | C,1 |

FIG. 11G

PEXCHG 2x2 Operation Table — 1180

| Target PE → | 0 | | 1 | | 2 | | 3 | |
|---|---|---|---|---|---|---|---|---|
| PeXchgCSctrl | Src PE | Mux ctrl | Src PE | Mux ctrl | Src PE | Mux ctrl | Src PE | Mux ctrl |
| 2x2_SWP0 | 1 | C,1 | 0 | C,0 | 3 | C,3 | 2 | C,2 |
| 2x2_SWP1 | 2 | C,2 | 3 | C,3 | 0 | C,0 | 1 | C,1 |
| 2x2_SWP2* | 3 | C,3 | 2 | C,2 | 1 | C,1 | 0 | C,0 |
| TRANSPOSE | 0 | C,0 | 2 | C,2 | 1 | C,1 | 3 | C,3 |
| DIAGONAL | 3 | C,3 | 1 | C,1 | 2 | C,2 | 0 | C,0 |
| SELF | 0 | C,0 | 1 | C,1 | 2 | C,2 | 3 | C,3 |
| 2x2_PE0 | 0 | C,0 | 0 | C,0 | 0 | C,0 | 0 | C,0 |
| 2x2_PE1 | 1 | C,1 | 1 | C,1 | 1 | C,1 | 1 | C,1 |
| 2x2_PE2 | 2 | C,2 | 2 | C,2 | 2 | C,2 | 2 | C,2 |
| 2x2_PE3 | 3 | C,3 | 3 | C,3 | 3 | C,3 | 3 | C,3 |
| 2x2_RING1F | 2 | C,2 | 0 | C,0 | 3 | C,3 | 1 | C,1 |
| 2x2_RING1R | 1 | C,1 | 3 | C,3 | 0 | C,0 | 2 | C,2 |
| 2x2_RING2F | 3 | C,3 | 0 | C,0 | 1 | C,1 | 2 | C,2 |
| 2x2_RING2R | 1 | C,1 | 2 | C,2 | 3 | C,3 | 0 | C,0 |

F=Forward and R=Reverse

LMX-LOAD MODULO INDEXED WITH SCALED UPDATE

ENCODING

1200

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | S/P | L/S | 100 | | CE1 | | Size | Rt | | | | | | 0 | | | | Mod/ Long | Brcst | Sign Ext | Scale | Pre-Dec/ Post Inc | UPDATE7[2:1] | | | UPDATE7[6:3] | | | | Ao | UPDATE7[0] |
| | | | | | | | | 0 | Rte | | | | | 0 | | | | Ae | | | | | | | | | | | | | |
| | | | | | | | | AtMRt | | | | | | | | | | | | | | | | | | | | | | | |

Syntax/Operation (pre-decrement)

| Instruction | Operands | Operation |
|---|---|---|
| | | Load Compute Register |
| LMX.[SP].D | Rte, Ae, -Ao, UPDATE7 | Ao.H0 ← Ao.H0 - (UPDATE7 * 8)<br>if(Ao.H0 < 0)Ao.H0 Ao.H0 + Ao.H1<br>Rto\|\|Rte ← Mem[Ae + Ao.H0]dword |
| LMX.[SP].W | Rt, Ae, -Ao, UPDATE7 | Ao.H0 ← Ao.H0 - (UPDATE7 * 4)<br>if(Ao.H0 < 0)<br>Ao.H0 Ao.H0 + Ao.H1<br>Rt ← Mem[Ae + Ao.H0]word |
| LMX.[SP].H0 | Rt, Ae, -Ao, UPDATE7 | Ao.H0 ← Ao.H0 - (UPDATE7 * 2)<br>if(Ao.H0 < 0)<br>Ao.H0 Ao.H0 + Ao.H1<br>Rt.H0 ← Mem[Ae + Ao.H0]hword |
| LMX.[SP].H0.X | Rt, Ae, -Ao, UPDATE7 | Ao.H0 ← Ao.H0 - (UPDATE7 * 2)<br>if(Ao.H0 < 0)<br>Ao.H0 Ao.H0 + Ao.H1<br>Rt.H0 ← Mem[Ae + Ao.H0]hword<br>Rt.H1 ← 0xFFFF if MSB(Mem[Ae + Ao.H0]hword)=1<br>Rt.H1 ← 0x0000 if MSB(Mem[Ae + Ao.H0]hword)=0 |
| LMX.[SP].B0 | Rt, Ae, -Ao, UPDATE7 | Ao.H0 ← Ao.H0 - UPDATE7<br>if(Ao.H0 < 0)<br>Ao.H0 ← Ao.H0 + Ao.H1<br>Rt.B0 ← Mem[Ae + Ao.H0]byte |
| LMX.[SP].B0.X | Rt, Ae, -Ao, UPDATE7 | Ao.H0 ← Ao.H0 - UPDATE7<br>if(Ao.H0 < 0)<br>Ao.H0 ← Ao.H0 + Ao.H1<br>Rt.B0 ← Mem[Ae + Ao.H0]byte<br>Rt.B1 ← 0xFF if MSB(Mem[Ae + Ao.H0]byte)=1<br>Rt.B1 ← 0x00 if MSB(Mem[Ae + Ao.H0]byte)=0<br>Rt.H1 ← 0xFFFF if MSB(Mem[Ae + Ao.H0]byte)=1<br>Rt.H1 ← 0x0000 if MSB(Mem[Ae + Ao.H0]byte)=0 |
| T.LMX.[SP].[DWH0B0].[X] | Rt, Ae, -Ao, UPDATE7 | Do operation only if T condition is satisfied in F0 |

FIG. 12B-2

| | | Load ARF/MRF Register |
|---|---|---|
| LMX.[SP].W | AtMRt, Ae, -Ao, UPDATE7 | Ao.H0 ← Ao.H0-(UPDATE7 * 4)<br>if(Ao.H0 < 0)<br>Ao.H0 ← Ao.H0 + Ao.H1<br>AtMRt ← Mem[Ae + Ao.H0]word |
| LMX.[SP].[H0H1] | AtMRt, Ae, -Ao, UPDATE7 | Ao.H0 ← Ao.H0-(UPDATE7 * 2)<br>if(Ao.H0 < 0)<br>Ao.H0 ← Ao.H0 + Ao.H1<br>AtMRt.Hx ← Mem[Ae + Ao.H0]hword (Note: Hx=H0 or H1) |
| LMX.[SP].H0.X | AtMRt, Ae, -Ao, UPDATE7 | Ao.H0 ← Ao.H0-(UPDATE7 * 2)<br>if(Ao.H0 < 0)<br>Ao.H0 Ao.H0 + Ao.H1<br>AtMRt.H0 ← Mem[Ae + Ao.H0]hword<br>AtMRt.H1 ← 0xFFFF if MSB(Mem[Ae + Ao.H0]hword)=1<br>AtMRt.H1 ← 0x0000 if MSB(Mem[Ae + Ao.H0]hword)=0 |
| T.LMX.[SP].[WH0B0].[X] | AtMRt, Ae, -Ao, UPDATE7 | Do operation only if T condition is satisfied in F0 |

NOTE: AtMRt is any register except a compute register. Doubleword access must align on doubleword boundaries Syntax/Operation (post-increment)

| Instruction | Operands | Operation |
|---|---|---|
| | | Load Compute Register |
| LMX.[SP].D | Rte, Ae, Ao+, UPDATE7 | Rto\|\|Rte ← Mem[Ae + Ao.H0]dword<br>Ao.H0 ← Ao.H0 + (UPDATE7 * 8)<br>if(Ao.H0 >= Ao.H1)<br>Ao.H0 ← Ao.H0 - Ao.H1 |
| LMX.[SP].W | Rt, Ae, Ao+, UPDATE7 | Rt ← Mem[Ae + Ao.H0]word<br>Ao.H0 ← Ao.H0 + (UPDATE7 * 4)<br>if(Ao.H0 >= Ao.H1)<br>Ao.H0 ← Ao.H0 - Ao.H1 |
| LMX.[SP].H0 | Rt, Ae, Ao+, UPDATE7 | Rt.H0 ← Mem[Ae + Ao.H0]hword<br>Ao.H0 ← Ao.H0 + (UPDATE7 * 2)<br>if(Ao.H0 >= Ao.H1)<br>Ao.H0 ← Ao.H0 - Ao.H1 |
| LMX.[SP].H0.X | Rt, Ae, Ao+, UPDATE7 | Rt.H0 ← Mem[Ae + Ao.H0]hword<br>Rt.H1 ← 0xFFFF if MSB(Mem[Ae + Ao.H0]hword)=1<br>Rt.H1 ← 0x0000 if MSB(Mem[Ae + Ao.H0]hword)=0<br>Ao.H0 ← Ao.H0 + (UPDATE7 * 2)<br>if(Ao.H0 >= Ao.H1)<br>Ao.H0 ← Ao.H0 - Ao.H1 |
| LMX.[SP].B0 | Rt, Ae, Ao+, UPDATE7 | Rt.B0 ← Mem[Ae + Ao.H0]byte<br>Ao.H0 ← Ao.H0 + UPDATE7<br>if(Ao.H0 >= Ao.H1)<br>Ao.H0 ← Ao.H0 - Ao.H1 |
| LMX.[SP].B0.X | Rt, Ae, Ao+, UPDATE7 | Rt.B0 ← Mem[Ae + Ao.H0]byte<br>Rt.B1 ← 0xFF if MSB(Mem[Ae + Ao.H0]byte)=1<br>Rt.B1 ← 0x00 if MSB(Mem[Ae + Ao.H0]byte)=0<br>Rt.H1 ← 0xFFFF if MSB(Mem[Ae + Ao.H0]byte)=1<br>Rt.H1 ← 0x0000 if MSB(Mem[Ae + Ao.H0]byte)=0<br>Ao.H0 ← Ao.H0 + UPDATE7<br>if(Ao.H0 >= Ao.H1)<br>Ao.H0 ← Ao.H0 - Ao.H1 |
| T.LMX.[SP].[DWH0B0].[X] | Rt, Ae, Ao+, UPDATE7 | Do operation only if T condition is satisfied in F0 |

FIG. 12B-3

| | | Load ARF/MRF Register |
|---|---|---|
| LMX.[SP].W | AtMRt, Ae, Ao+, UPDATE7 | AtMRt.H0 ← Mem[Ae + Ao.H0]word<br>Ao.H0 ← Ao.H0 + (UPDATE7 * 4)<br>if (Ao.H0 >= Ao.H1)<br>Ao.H0 ← Ao.H0 - Ao.H1 |
| LMX.[SP].[H0H1] | AtMRt, Ae, Ao+, UPDATE7 | AtMRt.Hx ← Mem[Ae + Ao.H0]hword (Note: Hx=H0 or H1)<br>Ao.H0 ← Ao.H0-(UPDATE7 * 2)<br>if (Ao.H0 >= Ao.H1)<br>Ao.H0 ← Ao.H0 - Ao.H1 |
| LMX.[SP].H0.X | AtMRt, Ae, Ao+, UPDATE7 | AtMRt.H0 ← Mem[Ae + Ao.H0]hword<br>AtMRt.H1 ← 0xFFFF if MSB(Mem[Ae + Ao.H0]hword)=1<br>AtMRt.H1 ← 0x0000 if MSB(Mem[Ae + Ao.H0]hword)=0<br>Ao.H0 ← Ao.H0+(UPDATE7 * 2)<br>if(Ao.H0 >= Ao.H1)<br>Ao.H0 ← Ao.H0 - Ao.H1 |
| T.LMX.[SP].[WH0H1].[X] | AtMRt, Ae, Ao+, UPDATE7 | Do operation only if T condition is satisfied in F0 |

NOTE: AtMRt is any register except a compute register. Doubleword access must align on doubleword boundaries Arithmetic Flags Affected
None
Cycles: 1

FIG. 13A

| Clk | 8x8 2D IDCT Program | SU | LU | ALU | MAU | DSU |
|---|---|---|---|---|---|---|
| 1 | xv.p V0,1,E=LAM,F= | nop | lmx.p.d R28,A0,A1+,1 | add.pa.2w R12,R10,R30 | sum2pa.pm.4sh R10,R0,R28 | ~~pexchg.pd.w R7,R7,2x2_swp0~~ |
| 2 | xv.p V0,2,E=LAM,F= | nop | lmx.p.d R28,A0,A1+,1 | add.pa.2w R14,R12,R30 | sum2pa.pm.4sh R12,R0,R28 | pexchg.pd.w R0,R0,2x2_swp0 |
| 3 | xv.p V0,3,E=LAM,F= | nop | lmx.p.d R28,A0,A1+,1 | add.pa.2w R16,R14,R30 | sum2pa.pm.4sh R14,R2,R28 | pexchg.pd.w R1,R1,2x2_swp0 |
| 4 | xv.p V0,4,E=LAM,F= | nop | lmx.p.d R28,A0,A1+,1 | add.pa.2w R18,R16,R30 | sum2pa.pm.4sh R16,R2,R28 | pexchg.pd.w R2,R2,2x2_swp0 |
| 5 | xv.p V0,5,E=LAM,F= | nop | lmx.p.d R28,A0,A1+,1 | add.pa.2w R20,R18,R30 | sum2pa.pm.4sh R18,R4,R28 | pexchg.pd.w R3,R3,2x2_swp0 |
| 6 | xv.p V0,6,E=LAM,F= | nop | lmx.p.d R28,A0,A1+,1 | add.pa.2w R22,R20,R30 | sum2pa.pm.4sh R20,R4,R28 | pexchg.pd.w R4,R4,2x2_swp0 |
| 7 | xv.p V0,7,E=LAM,F= | nop | lmx.p.d R28,A0,A1+,1 | add.pa.2w R24,R22,R30 | sum2pa.pm.4sh R22,R6,R28 | pexchg.pd.w R5,R5,2x2_swp0 |
| 8 | xv.p V0,8,E=LAM,F= | nop | lmx.p.d R28,A0,A1+,1 | nop  1341 | sum2pa.pm.4sh R24,R6,R28 | pexchg.pd.w R6,R6,2x2_swp0 |
| 9 | xv.p V0,1,E=LM,F= | nop | lmx.p.d R28,A0,A1+,1 | ~~add.pa.2w R12,R10,R30~~ | sum2pa.pm.4sh R10,R0,R28 | pexchg.pd.w R7,R7,2x2_swp0 |
| 10 | xv.p V0,2,E=LM,F= | nop | lmx.p.d R28,A0,A1+,1 | ~~add.pa.2w R14,R12,R30~~ | sum2pa.pm.4sh R12,R0,R28 | ~~pexchg.pd.w R0,R0,2x2_swp0~~ |
| 11 | xv.p V0,3,E=LM,F= | nop | lmx.p.d R28,A0,A1+,1 | ~~add.pa.2w R16,R14,R30~~ | sum2pa.pm.4sh R14,R2,R28 | ~~pexchg.pd.w R1,R1,2x2_swp0~~ |
| 12 | xv.p V0,4,E=LM,F= | nop | lmx.p.d R28,A0,A1+,1 | ~~add.pa.2w R18,R16,R30~~ | sum2pa.pm.4sh R16,R2,R28 | ~~pexchg.pd.w R2,R2,2x2_swp0~~ |
| 13 | xv.p V0,5,E=LM,F= | nop | lmx.p.d R28,A0,A1+,1 | ~~add.pa.2w R20,R18,R30~~ | sum2pa.pm.4sh R18,R4,R28 | ~~pexchg.pd.w R3,R3,2x2_swp0~~ |
| 14 | xv.p V0,6,E=LM,F= | nop | lmx.p.d R28,A0,A1+,1 | ~~add.pa.2w R22,R20,R30~~ | sum2pa.pm.4sh R20,R4,R28 | ~~pexchg.pd.w R4,R4,2x2_swp0~~ |
| 15 | xv.p V0,10,E=LAM,F= | nop | lmx.p.d R28,A0,A1+,1 | bflys.pa.4sh R0,R10H1,R18H1 | sum2pa.pm.4sh R22,R6,R28 | nop |
| 16 | xv.p V0,26,E=LAM,F= | nop | lmx.p.d R28,A0,A1+,1 | bflys.pa.4sh R2,R12H1,R20H1 | sum2pa.pm.4sh R24,R6,R28 | perm.pd.8b R0,R0,R8 |
| 17 | xv.p V0,12,E=LAM,F= | nop | lmx.p.d R28,A0,A1+,1 | bflys.pa.4sh R4,R14H1,R22H1 | sum2pa.pm.4sh R10,R0,R28 | nop |
| 18 | xv.p V0,13,E=LAMD,F= | nop | lmx.p.d R28,A0,A1+,1 | bflys.pa.4sh R6,R16H1,R24H1 | sum2pa.pm.4sh R12,R0,R28 | perm.pd.8b R2,R2,R8 |

FIG. 13B

| Clk | 8x8 2D IDCT Program | SU | LU | ALU | MAU | DSU |
|---|---|---|---|---|---|---|
| 19 | xv.p V0,14,E=LM,F= | nop | lmx.p.d R28,A0,A1+,1 | nop | sum2p.pm.4sh R14,R2,R28 | ~~nop~~ |
| 20 | xv.p V0,15,E=LMD,F= | nop | lmx.p.d R28,A0,A1+,1 | nop | sum2p.pm.4sh R16,R2,R28 | perm.pd.8b R4,R4,R8 |
| 21 | xv.p V0,16,E=LM,F= | nop | lmx.p.d R28,A0,A1+,1 | nop | sum2p.pm.4sh R18,R4,R28 | nop |
| 22 | xv.p V0,17,E=LMD,F= | nop | lmx.p.d R28,A0,A1+,1 | nop | sum2p.pm.4sh R20,R4,R28 | perm.pd.8b R6,R6,R8 |
| 23 | xv.p V0,18,E=LM,F= | nop | lmx.p.d R28,A0,A1+,1 | nop | sum2p.pm.4sh R22,R6,R28 | pexchg.pd.w R0,R0,2x2_swp1 |
| 24 | xv.p V0,19,E=LMD,F= | nop | lmx.p.d R28,A0,A1+,1 | nop | sum2p.pm.4sh R24,R6,R28 | pexchg.pd.w R1,R1,2x2_swp0 |
| 25 | xv.p V0,20,E=LM,F= | nop | lmx.p.d R28,A0,A1+,1 | nop | sum2pa.pm.4sh R10,R0,R28 | pexchg.pd.w R2,R2,2x2_swp0 |
| 26 | xv.p V0,21,E=LMD,F= | nop | lmx.p.d R28,A0,A1+,1 | nop | sum2pa.pm.4sh R12,R0,R28 | pexchg.pd.w R3,R3,2x2_swp0 |
| 27 | xv.p V0,22,E=LM,F= | nop | lmx.p.d R28,A0,A1+,1 | nop | sum2pa.pm.4sh R14,R2,R28 | pexchg.pd.w R4,R4,2x2_swp0 |
| 28 | xv.p V0,23,E=LMD,F= | nop | lmx.p.d R28,A0,A1+,1 | nop | sum2pa.pm.4sh R16,R2,R28 | pexchg.pd.w R5,R5,2x2_swp0 |
| 29 | xv.p V0,24,E=LM,F= | nop | lmx.p.d R28,A0,A1+,1 | nop | sum2pa.pm.4sh R18,R4,R28 | pexchg.pd.w R6,R6,2x2_swp0 |
| 30 | xv.p V0,25,E=LMD,F= | nop | lmx.p.d R28,A0,A1+,1 | nop | sum2pa.pm.4sh R20,R4,R28 | pexchg.pd.w R7,R7,2x2_swp0 |
| 31 | xv.p V0,9,E=LAM,F= | nop | lmx.p.d R28,A0,A1+,1 | bflys.pa.4sh R0,R10H1,R18H1 | sum2pa.pm.4sh R22,R6,R28 | |
| 32 | xv.p V0,26,E=LM,F= | nop | lmx.p.d R28,A0,A1+,1 | ~~bflys.pa.4sh R2,R12H1,R20H1~~ 1342 | sum2pa.pm.4sh R24,R6,R28 | ~~perm.pd.8b R0,R0,R8~~ |
| 33 | bflys.pa.4sh R2,R12H1,R20H1 | NA | NA | NA | NA | NA |
| 34 | xv.p V0,0,E=AM,F= | nop | nop | bflys.pa.4sh R4,R14H1,R22H1 | bflys.pa.4sh R6,R16H1,R24H1 | nop |

FIG. 14

| $F\ x_a,x_a$ | $F\ x_a,x_b$ | $F\ x_a,x_c$ | $F\ x_a,x_d$ | $F\ x_a,y_m$ | $F\ x_a,y_n$ | $F\ x_a,y_o$ | $F\ x_a,y_p$ |
|---|---|---|---|---|---|---|---|
| $F\ x_b,x_a$ | $F\ x_b,x_b$ | $F\ x_b,x_c$ | $F\ x_b,x_d$ | $F\ x_b,y_m$ | $F\ x_b,y_n$ | $F\ x_b,y_o$ | $F\ x_b,y_p$ |
| $F\ x_c,x_a$ | $F\ x_c,x_b$ | $F\ x_c,x_c$ | $F\ x_c,x_d$ | $F\ x_c,y_m$ | $F\ x_c,y_n$ | $F\ x_c,y_o$ | $F\ x_c,y_p$ |
| $F\ x_d,x_a$ | $F\ x_d,x_b$ | $F\ x_d,x_c$ | $F\ x_d,x_d$ | $F\ x_d,y_m$ | $F\ x_d,y_n$ | $F\ x_d,y_o$ | $F\ x_d,y_p$ |
| $F\ y_m,x_a$ | $F\ y_m,x_b$ | $F\ y_m,x_c$ | $F\ y_m,x_d$ | $F\ y_m,y_m$ | $F\ y_m,y_n$ | $F\ y_m,y_o$ | $F\ y_m,y_p$ |
| $F\ y_n,x_a$ | $F\ y_n,x_b$ | $F\ y_n,x_c$ | $F\ y_n,x_d$ | $F\ y_n,y_m$ | $F\ y_n,y_n$ | $F\ y_n,y_o$ | $F\ y_n,y_p$ |
| $F\ y_o,x_a$ | $F\ y_o,x_b$ | $F\ y_o,x_c$ | $F\ y_o,x_d$ | $F\ y_o,y_m$ | $F\ y_o,y_n$ | $F\ y_o,y_o$ | $F\ y_o,y_p$ |
| $F\ y_p,x_a$ | $F\ y_p,x_b$ | $F\ y_p,x_c$ | $F\ y_p,x_d$ | $F\ y_p,y_m$ | $F\ y_p,y_n$ | $F\ y_p,y_o$ | $F\ y_p,y_p$ |

| $I\ x_a,0$ | $I\ x_b,0$ | $I\ x_c,0$ | $I\ x_d,0$ | $I\ y_m,0$ | $I\ y_n,0$ | $I\ y_o,0$ | $I\ y_p,0$ |
|---|---|---|---|---|---|---|---|
| $I\ x_a,1$ | $I\ x_b,1$ | $I\ x_c,1$ | $I\ x_d,1$ | $I\ y_m,1$ | $I\ y_n,1$ | $I\ y_o,1$ | $I\ y_p,1$ |
| $I\ x_a,2$ | $I\ x_b,2$ | $I\ x_c,2$ | $I\ x_d,2$ | $I\ y_m,2$ | $I\ y_n,2$ | $I\ y_o,2$ | $I\ y_p,2$ |
| $I\ x_a,3$ | $I\ x_b,3$ | $I\ x_c,3$ | $I\ x_d,3$ | $I\ y_m,3$ | $I\ y_n,3$ | $I\ y_o,3$ | $I\ y_p,3$ |
| $I\ x_a,4$ | $I\ x_b,4$ | $I\ x_c,4$ | $I\ x_d,4$ | $I\ y_m,4$ | $I\ y_n,4$ | $I\ y_o,4$ | $I\ y_p,4$ |
| $I\ x_a,5$ | $I\ x_b,5$ | $I\ x_c,5$ | $I\ x_d,5$ | $I\ y_m,5$ | $I\ y_n,5$ | $I\ y_o,5$ | $I\ y_p,5$ |
| $I\ x_a,6$ | $I\ x_b,6$ | $I\ x_c,6$ | $I\ x_d,6$ | $I\ y_m,6$ | $I\ y_n,6$ | $I\ y_o,6$ | $I\ y_p,6$ |
| $I\ x_a,7$ | $I\ x_b,7$ | $I\ x_c,7$ | $I\ x_d,7$ | $I\ y_m,7$ | $I\ y_n,7$ | $I\ y_o,7$ | $I\ y_p,7$ |

| P 0,0 | P 0,1 | P 0,2 | P 0,3 | P 0,4 | P 0,5 | P 0,6 | P 0,7 |
|-------|-------|-------|-------|-------|-------|-------|-------|
| P 1,0 | P 1,1 | P 1,2 | P 1,3 | P 1,4 | P 1,5 | P 1,6 | P 1,7 |
| P 2,0 | P 2,1 | P 2,2 | P 2,3 | P 2,4 | P 2,5 | P 2,6 | P 2,7 |
| P 3,0 | P 3,1 | P 3,2 | P 3,3 | P 3,4 | P 3,5 | P 3,6 | P 3,7 |
| P 4,0 | P 4,1 | P 4,2 | P 4,3 | P 4,4 | P 4,5 | P 4,6 | P 4,7 |
| P 5,0 | P 5,1 | P 5,2 | P 5,3 | P 5,4 | P 5,5 | P 5,6 | P 5,7 |
| P 6,0 | P 6,1 | P 6,2 | P 6,3 | P 6,4 | P 6,5 | P 6,6 | P 6,7 |
| P 7,0 | P 7,1 | P 7,2 | P 7,3 | P 7,4 | P 7,5 | P 7,6 | P 7,7 |

| LOAD | ALU | MAU | DSU | STORE |
|---|---|---|---|---|
| lii.s.d R0,A0+,1 | | | | |
| lii.s.d R2,A0+,1 | | | | |
| lii.s.d R28,A1+,1 | add.sa.2w R4,R30,R30 | | | |
| lii.s.d R28,A1+,1 | add.sa.2w R6,R30,R30 | sum2pa.sm.4sh R4,R0,R28 A'=0*p0+2*p2,B=4*m4+6*m2 | | |
| lii.s.d R28,A1+,1 | add.sa.2w R8,R30,R30 | sum2pa.sm.4sh R8,R0,R28 C'=0*p0+2*m6,D=4*m4+6*m6 | | |
| lii.s.d R28,A1+,1 | add.sa.2w R10,R30,R30 | sum2pa.sm.4sh R6,R2,R28 H'=1*p1+3*p3,G'=5*m1+7*m5 | | |
| lii.s.d R28,A1+,1 | | sum2pa.sm.4sh R10,R2,R28 F'=1*p5+3*m1,E'=5*p3+7*m1 | perm.sd 8b R0,R0,R26 | |
| lii.s.d R28,A1+,1 | | sum2pa.sm.4sh R4,R0,R28 A+=4*p4+6*p6,B+=0*p0+2*p6 | perm.sd 8b R2,R2,R26 | |
| lii.s.d R28,A1+,1 | | sum2pa.sm.4sh R6,R2,R28 H+=5*p5+7*p7,G+=1*p3+3*m7 | | |
| lii.s.d R28,A1+,1 | | sum2pa.sm.4sh R8,R0,R28 C+=4*p4+6*p2,D+=0*p0+2*m2 | | |
| | add.sa.2w R12,R4,R6 0=A+H,1=B+G | sum2pa.sm.4sh R10,R2,R28 F+=5*p7+7*p3,E+=1*p7.3*m5 | | |
| | add.sa.2w R18,R4,R6 7=A-H,6=B-G | | | |
| | add.sa.2w R14,R8,R10 2=C+F,3=D+E | sub.sm.2w R16,R8,R10 5=C-F,4=D-E | | |
| | | | shri.sd.2sw R12,R12,16 | |
| | | | shri.sd.2sw R18,R18,16 | sii.s.h0 R13,A2+,1 |
| | | | shri.sd.2sw R14,R14,16 | sii.s.h0 R12,A2+,1 |
| | | | shri.sd.2sw R16,R16,16 | sii.s.h0 R15,A2+,1 |
| | | | | sii.s.h0 R14,A2+,1 |
| | | | | sii.s.h0 R16,A2+,1 |
| | | | | sii.s.h0 R17,A2+,1 |
| | | | | sii.s.h0 R18,A2+,1 |
| | | | | sii.s.h0 R19,A2+,1 |

```
lv.s  V0,0,3,D=,f=
lii.s.d    R0,A0+,1
sub.sa.2w    R18,R4,R6
shri.sd.2sw R12,R12,16 lv.s  V0,1,5,D=,f=
lii.s.d    R2,A0+,1
add.sa.2w    R14,R8,R10
sub.sm.2w    R16,R8,R10
shri.sd.2sw R18,R18,16
sii.s.h0    R13,A2+,8 lv.s  V0,2,4,D=,f=
lii.s.d    R28,A1+,1
add.sa.2w    R4,R30,R30
shri.sd.2sw R14,R14,16
sii.s.h0    R12,A2+,8 lv.s  V0,3,5,D=,f=
lii.s.d    R28,A1+,1
add.sa.2w    R8,R30,R30
sum.2pa.sm.4sh R4,R0,R28
shri.sd.2sw R16,R16,16
sii.s.h0    R15,A2+,8
```

```
lv.s   V0,4,4,D=,f=
lii.s.d    R28,A1+,1
add.sa.2w    R6,R30,R30
sum.2pa.sm.4sh  R8,R0,R28
sii.s.h0   R14,A2+,8 lv.s   V0,5,4,D=,f=
lii.s.d    R28,A1+,1
add.sa.2w    R10,R30,R30
sum.2pa.sm.4sh  R6,R2,R28
sii.s.h0   R16,A2+,8 lv.s   V0,6,4,D=,f=
lii.s.d    R28,A1+,1
sum.2pa.sm.4sh  R10,R2,R28
perm.sd.8b   R0,R0,R26
sii.s.h0   R17,A2+,8 lv.s   V0,7,4,D=,f=
lii.s.d    R28,A1+,1
sum.2pa.sm.4sh  R4,R0,R28
perm.sd.8b   R2,R2,R26
sii.s.h0   R18,A2+,8
```

```
lv.s   V0,8,3,D=,f=
lii.s.d    R28,A1+,1
sum.2pa.sm.4sh  R6,R2,R28
sii.s.h0   R19,A2-,55 lv.s   V0,9,2,D=,f=
lii.s.d    R28,A1+,1
sum.2pa.sm.4sh  R10,R2,R28 lv.s   V0,6,4,D=,f=
lii.s.d    R28,A1+,1
sum.2pa.sm.4sh  R10,R2,R28
```

```
!The code for performing an 8x8 IDCT is as follows
lim.s.w A0,input_array
lim.s.w A1,cos_coeffs
lim.s.w A2,array1         !An intermediate 8x8 16-bit array
ld.s.d R30,rbitsdiv2      !Rounding constant xv.s V0,0,E=L,F=
xv.s V0,1,E=L,F=
xv.s V0,2,E=LA,F=
xv.s V0,3,E=LAM,F=
xv.s V0,4,E=LAM,F=
xv.s V0,5,E=LAM,F=
xv.s V0,6,E=LMD,F=
xv.s V0,7,E=LMD,F=
xv.s V0,8,E=LM,F=
xv.s V0,9,E=LM,F=
xv.s V0,10,E=AM,F= xv.s V0,0,E=LAD,F=
xv.s V0,1,E=LAMDS,F=
xv.s V0,2,E=LADS,F=
xv.s V0,3,E=LAMDS,F=
xv.s V0,4,E=LAMS,F=
xv.s V0,5,E=LAMS,F=
xv.s V0,6,E=LMDS,F=
xv.s V0,7,E=LMDS,F=
xv.s V0,8,E=LMS,F=
xv.s V0,9,E=LM,F=
xv.s V0,10,E=AM,F=
```

```
xv.s V0,0,E=LAD,F=
xv.s V0,1,E=LAMDS,F=
xv.s V0,2,E=LADS,F=
xv.s V0,3,E=LAMDS,F=
xv.s V0,4,E=LAMS,F=
xv.s V0,5,E=LAMS,F=
xv.s V0,6,E=LMDS,F=
xv.s V0,7,E=LMDS,F=
xv.s V0,8,E=LMS,F=
xv.s V0,9,E=LM,F=
xv.s V0,10,E=AM,F= xv.s V0,0,E=LAD,F=
xv.s V0,1,E=LAMDS,F=
xv.s V0,2,E=LADS,F=
xv.s V0,3,E=LAMDS,F=
xv.s V0,4,E=LAMS,F=
xv.s V0,5,E=LAMS,F=
xv.s V0,6,E=LMDS,F=
xv.s V0,7,E=LMDS,F=
xv.s V0,8,E=LMS,F=
xv.s V0,9,E=LM,F=
xv.s V0,10,E=AM,F=
```

```
xv.s V0,0,E=LAD,F=
xv.s V0,1,E=LAMDS,F=
xv.s V0,2,E=LADS,F=
xv.s V0,3,E=LAMDS,F=
xv.s V0,4,E=LAMS,F=
xv.s V0,5,E=LAMS,F=
xv.s V0,6,E=LMDS,F=
xv.s V0,7,E=LMDS,F=
xv.s V0,8,E=LMS,F=
xv.s V0,9,E=LM,F=
xv.s V0,10,E=AM,F= xv.s V0,0,E=LAD,F=
xv.s V0,1,E=LAMDS,F=
xv.s V0,2,E=LADS,F=
xv.s V0,3,E=LAMDS,F=
xv.s V0,4,E=LAMS,F=
xv.s V0,5,E=LAMS,F=
xv.s V0,6,E=LMDS,F=
xv.s V0,7,E=LMDS,F=
xv.s V0,8,E=LMS,F=
xv.s V0,9,E=LM,F=
xv.s V0,10,E=AM,F=
```

```
xv.s V0,0,E=LAD,F=
xv.s V0,1,E=LAMDS,F=
xv.s V0,2,E=LADS,F=
xv.s V0,3,E=LAMDS,F=
xv.s V0,4,E=LAMS,F=
xv.s V0,5,E=LAMS,F=
xv.s V0,6,E=LMDS,F=
xv.s V0,7,E=LMDS,F=
xv.s V0,8,E=LMS,F=
xv.s V0,9,E=LM,F=
xv.s V0,10,E=AM,F= xv.s V0,0,E=LAD,F=
xv.s V0,1,E=LAMDS,F=
xv.s V0,2,E=LADS,F=
xv.s V0,3,E=LAMDS,F=
xv.s V0,4,E=LAMS,F=
xv.s V0,5,E=LAMS,F=
xv.s V0,6,E=LMDS,F=
xv.s V0,7,E=LMDS,F=
xv.s V0,8,E=LMS,F=
xv.s V0,9,E=LM,F=
xv.s V0,10,E=AM,F=
```

```
xv.s V0,0,E=AD,F=
xv.s V0,1,E=AMDS,F=
xv.s V0,2,E=DS,F=
xv.s V0,3,E=DS,F=
xv.s V0,4,E=S,F=
xv.s V0,5,E=S,F=
xv.s V0,6,E=S,F=
xv.s V0,7,E=S,F=
xv.s V0,8,E=S,F=
```
— 1835

FIG. 18I

```
!Now, the second dimension:
lim.s.w A0,array1        !The output of the first pass is input for the second
lim.s.w A1,cos_coeffs
lim.s.w A2,output_buffer !The 8x8 16-bit array for the output
sub.sa.2w R30,R30,R30    !Loading 0 into the rounding constant register xv.s V0,0,E=L,F=
xv.s V0,1,E=L,F=
xv.s V0,2,E=LA,F=
xv.s V0,3,E=LAM,F=
xv.s V0,4,E=LAM,F=
xv.s V0,5,E=LAM,F=
xv.s V0,6,E=LMD,F=
xv.s V0,7,E=LMD,F=
xv.s V0,8,E=LM,F=
xv.s V0,9,E=LM,F=
xv.s V0,10,E=AM,F=
```
— 1840

FIG. 18J

```
xv.s V0,0,E=LAD,F=
xv.s V0,1,E=LAMDS,F=
xv.s V0,2,E=LADS,F=
xv.s V0,3,E=LAMDS,F=
xv.s V0,4,E=LAMS,F=
xv.s V0,5,E=LAMS,F=
xv.s V0,6,E=LMDS,F=
xv.s V0,7,E=LMDS,F=
xv.s V0,8,E=LMS,F=
xv.s V0,9,E=LM,F=
xv.s V0,10,E=AM,F= xv.s V0,0,E=LAD,F=
xv.s V0,1,E=LAMDS,F=
xv.s V0,2,E=LADS,F=
xv.s V0,3,E=LAMDS,F=
xv.s V0,4,E=LAMS,F=
xv.s V0,5,E=LAMS,F=
xv.s V0,6,E=LMDS,F=
xv.s V0,7,E=LMDS,F=
xv.s V0,8,E=LMS,F=
xv.s V0,9,E=LM,F=
xv.s V0,10,E=AM,F=
```

```
xv.s V0,0,E=LAD,F=
xv.s V0,1,E=LAMDS,F=
xv.s V0,2,E=LADS,F=
xv.s V0,3,E=LAMDS,F=
xv.s V0,4,E=LAMS,F=
xv.s V0,5,E=LAMS,F=
xv.s V0,6,E=LMDS,F=
xv.s V0,7,E=LMDS,F=
xv.s V0,8,E=LMS,F=
xv.s V0,9,E=LM,F=
xv.s V0,10,E=AM,F= xv.s V0,0,E=LAD,F=
xv.s V0,1,E=LAMDS,F=
xv.s V0,2,E=LADS,F=
xv.s V0,3,E=LAMDS,F=
xv.s V0,4,E=LAMS,F=
xv.s V0,5,E=LAMS,F=
xv.s V0,6,E=LMDS,F=
xv.s V0,7,E=LMDS,F=
xv.s V0,8,E=LMS,F=
xv.s V0,9,E=LM,F=
xv.s V0,10,E=AM,F=
```

```
xv.s V0,0,E=LAD,F=
xv.s V0,1,E=LAMDS,F=
xv.s V0,2,E=LADS,F=
xv.s V0,3,E=LAMDS,F=
xv.s V0,4,E=LAMS,F=
xv.s V0,5,E=LAMS,F=
xv.s V0,6,E=LMDS,F=
xv.s V0,7,E=LMDS,F=
xv.s V0,8,E=LMS,F=
xv.s V0,9,E=LM,F=
xv.s V0,10,E=AM,F= xv.s V0,0,E=LAD,F=
xv.s V0,1,E=LAMDS,F=
xv.s V0,2,E=LADS,F=
xv.s V0,3,E=LAMDS,F=
xv.s V0,4,E=LAMS,F=
xv.s V0,5,E=LAMS,F=
xv.s V0,6,E=LMDS,F=
xv.s V0,7,E=LMDS,F=
xv.s V0,8,E=LMS,F=
xv.s V0,9,E=LM,F=
xv.s V0,10,E=AM,F=
```

```
xv.s V0,0,E=LAD,F=
xv.s V0,1,E=LAMDS,F=
xv.s V0,2,E=LADS,F=
xv.s V0,3,E=LAMDS,F=
xv.s V0,4,E=LAMS,F=
xv.s V0,5,E=LAMS,F=
xv.s V0,6,E=LMDS,F=
xv.s V0,7,E=LMDS,F=
xv.s V0,8,E=LMS,F=
xv.s V0,9,E=LM,F=
xv.s V0,10,E=AM,F= xv.s V0,0,E=AD,F=
xv.s V0,1,E=AMDS,F=
xv.s V0,2,E=DS,F=
xv.s V0,3,E=DS,F=
xv.s V0,4,E=S,F=
xv.s V0,5,E=S,F=
xv.s V0,6,E=S,F=
xv.s V0,7,E=S,F=
xv.s V0,8,E=S,F=
```

LII - LOAD INDIRECT WITH SCALED IMMEDIATE UPDATE

ENCODING — 1900

| 31 30 | 29 | 28 | 27 26 25 | 24 | 23 22 | 21 | 20 19 18 17 16 | 15 14 13 | 12 | 11 | 10 | 9 | 8 | 7 | 6 5 4 3 2 1 0 |
|---|---|---|---|---|---|---|---|---|---|---|---|---|---|---|---|
| Group | S/P | L/S | 101 | CE1 | Size | 0 | 0 Rt 0 / 0 Rte 0 / AtMRt | An | Brcst | Sign Ext | Scale | Pre/ POST | Dec/ Inc | Imm/ Rt =0 | UPDATE7 |

FIG. 19B-1

SYNTAX/OPERATION (pre-decrement / pre-increment) — 1910

| Instruction | Operands | Operation |
|---|---|---|
| | | Load Compute Register |
| LII.[SP].D | Rte, ±An, UPDATE7 | An ← An ± (UPDATE7 * 8)<br>Rto\|\|Rte ← Mem[An]dword |
| LII.[SP].W | Rt, ±An, UPDATE7 | An ← An ± (UPDATE7 * 4)<br>Rt ← Mem[An]word |
| LII.[SP].H0 | Rt, ±An, UPDATE7 | An ← An ± (UPDATE7 * 2)<br>Rt.H0 ← Mem[An]hword |
| LII.[SP].H0.X | Rt, ±An, UPDATE7 | An ← An ± (UPDATE7 * 2)<br>Rt.H0 ← Mem[An]hword<br>Rt.H1 ← 0xFFFF if MSB(Mem[An]hword)=1<br>Rt.H1 ← 0x0000 if MSB(Mem[An]hword)=0 |
| LII.[SP].B0 | Rt, ±An, UPDATE7 | An ← An ± UPDATE7<br>Rt.B0 ← Mem[An]byte |
| LII.[SP].B0.X | Rt, ±An, UPDATE7 | An ← An ± UPDATE7<br>Rt.B0 ← Mem[An]byte<br>Rt.B1 ← 0xFF if MSB (Mem[An]byte)=1<br>Rt.B1 ← 0x00 if MSB (Mem[An]byte)=0<br>Rt.H1 ← 0xFFFF if MSB(Mem[An]byte)=1<br>Rt.H1 ← 0x0000 if MSB(Mem[An]byte)=0 |
| T.LII.[SP].[DWH0B0].[X] | Rt, ±An, UPDATE7 | Do operation only if T condition is satisfied in F0 |
| | | Load ARF/MRF Register |
| LII.[SP].W | AtMRt, ±An, UPDATE7 | An ← An ± (UPDATE7 * 4)<br>AtMRt ← Mem[An]word |
| LII.[SP].[H0H1] | AtMRt, ±An, UPDATE7 | An ← An ± (UPDATE7 * 2)<br>AtMRt.Hx ← Mem[An]hword (NOTE: Hx=H0 or H1) |
| LII.[SP].H0.X | AtMRt, ±An, UPDATE7 | An ← An ± (UPDATE7 * 2)<br>AtMRt.H0 ← Mem[An]hword<br>AtMRt.H1 ← 0xFFFF if MSB(Mem[An]hword)=1<br>AtMRt.H1 ← 0x0000 if MSB(Mem[An]hword)=0 |
| T.LII.[SP].[WH0H1].[X] | AtMRt, ±An, UPDATE7 | Do operation only if T condition is satisfied in F0 |

NOTE: AtMRt is any register except a compute register.
Doubleword access must align on doubleword boundaries.

FIG. 19B-2

SYNTAX/OPERATION (post-decrement / post-increment)

| Instruction | Operands | Operation |
|---|---|---|
| | | Load Compute Register |
| LII.[SP].D | Rte, An±, UPDATE7 | Rto\|\|Rte ← Mem[An]dword<br>An ← An ± (UPDATE7 * 8) |
| LII.[SP].W | Rte, An±, UPDATE7 | Rt ← Mem[An]word<br>An ← An ± (UPDATE7 * 4) |
| LII.[SP].H0 | Rte, An±, UPDATE7 | Rt.H0 ← Mem[An]hword<br>An ← An ± (UPDATE7 * 2) |
| LII.[SP].H0.X | Rte, An±, UPDATE7 | Rt.H0 ← Mem[An]hword<br>Rt.H1 ← 0xFFFF if MSB(Mem[An]hword)=1<br>Rt.H1 ← 0x0000 if MSB(Mem[An]hword)=0<br>An ← An ± (UPDATE7 * 2) |
| LII.[SP].B0 | Rt, An±, UPDATE7 | Rt.B0 ← Mem[An]byte<br>An ← An ± UPDATE7 |
| LII.[SP].B0.X | Rt, An±, UPDATE7 | Rt.B0 ← Mem[An]byte<br>Rt.B1 ← 0xFF if MSB (Mem[An]byte)=1<br>Rt.B1 ← 0x00 if MSB (Mem[An]byte)=0<br>Rt.H1 ← 0xFFFF if MSB(Mem[An]byte)=1<br>Rt.H1 ← 0x0000 if MSB(Mem[An]byte)=0<br>An ← An ± UPDATE7 |
| T.LII.[SP].[DWH0B0].[X] | Rt, An±, UPDATE7 | Do operation only if T condition is satisfied in F0 |
| | | Load ARF/MRF Register |
| LII.[SP].W | AtmRt, An±, UPDATE7 | AtMRt ← Mem[An]word<br>An ← An ± (UPDATE7 * 4) |
| LII.[SP].[H0H1] | AtmRt, An±, UPDATE7 | AtMRt.Hx ← Mem[An]hword (NOTE: Hx=H0 or H1)<br>An ← An ± (UPDATE7 * 2) |
| LII.[SP].H0.X | AtmRt, An±, UPDATE7 | AtMRt.H0 ← Mem[An]hword<br>AtMRt.H1 ← 0xFFFF if MSB(Mem[An]hword)=1<br>AtMRt.H1 ← 0x0000 if MSB(Mem[An]hword)=0<br>An ← An ± (UPDATE7 * 2) |
| T.LII.[SP].[WH0H1].[X] | AtmRt, An±, UPDATE7 | Do operation only if T condition is satisfied in F0 |

NOTE: AtMRt is any register except a compute register.
Doubleword access must align on doubleword boundaries.
Arithmetic Flags Affected
None Cycles: 1

FIG. 20A

SUB - SUBTRACT  
ENCODING 2000

| 31 30 29 | 28 27 26 | 25 24 23 22 21 | 20 19 18 17 16 | 15 | 14 13 12 11 | 10 9 8 7 6 | 5 | 4 3 2 | 1 0 |
|---|---|---|---|---|---|---|---|---|---|
| GROUP | S/P | UNIT | ALUopcode / MAUopcode | Rt / Rte | 0 | Rx / Rxe | Ry / Rye | 0 | CE3 | DPack |

FIG. 20B-1

Syntax/Operation 2010

| Instruction | Operands | Operation | ACF |
|---|---|---|---|
| | | | Doubleword |
| SUB.[SP][AM].1D | Rte, Rxe, Rye | Do operation below but do not affect ACFs | None |
| SUB[CNVZ].[SP][AM].1D | Rte, Rxe, Rye | Rto\|\|Rte ← Rxo\|\|Rxe - Ryo\|\|Rye | F3 |
| [TF].SUB.[SP][AM].1D | Rte, Rxe, Rye | Do operation only if T/F condition is satisfied in ACFs | None |
| | | | Word |
| SUB.[SP][AM].1W | Rt, Rx, Ry | Do operation below but do not affect ACFs | None |
| SUB[CNVZ].[SP][AM].1W | Rt, Rx, Ry | Rt ← Rx - Ry | F0 |
| [TF].SUB.[SP][AM].1W | Rt, Rx, Ry | Do operation only if T/F condition is satisfied in ACFs | None |
| | | | Dual Words |
| SUB.[SP][AM].2W | Rte, Rxe, Rye | Do operation below but do not affect ACFs | None |
| SUB[CNVZ].[SP][AM].2W | Rte, Rxe, Rye | Rto ← Rxo - Ryo<br>Rte ← Rxe - Rye | F1<br>F0 |
| [TF].SUB.[SP][AM].2W | Rte, Rxe, Rye | Do operation only if T/F condition is satisfied in ACFs | None |
| | | | Dual Halfwords |
| SUB.[SP][AM].2H | Rt, Rx, Ry | Do operation below but do not affect ACFs | None |
| SUB[CNVZ].[SP][AM].2H | Rt, Rx, Ry | Rt.H1 ← Rx.H1 - Ry.H1<br>Rt.H0 ← Rx.H0 - Ry.H0 | F1<br>F0 |
| [TF].SUB.[SP][AM].2H | Rt, Rx, Ry | Do operation only if T/F condition is satisfied in ACFs | None |
| | | | Quad Halfwords |
| SUB.[SP][AM].4H | Rte, Rxe, Rye | Do operation below but do not affect ACFs | None |
| SUB[CNVZ].[SP][AM].4H | Rte, Rxe, Rye | Rto.H1 ← Rxo.H1 - Ryo.H1<br>Rto.H0 ← Rxo.H0 - Ryo.H0<br>Rte.H1 ← Rxe.H1 - Rye.H1<br>Rte.H0 ← Rxe.H0 - Rye.H0 | F3<br>F2<br>F1<br>F0 |
| [TF].SUB.[SP][AM].4H | Rte, Rxe, Rye | Do operation only if T/F condition is satisfied in ACFs | None |

FIG. 20B-2

| | | | Quad Bytes | |
|---|---|---|---|---|
| SUB.[SP][AM].4B | Rt, Rx, Ry | Do operation below but do not affect ACFs | | None |
| SUB[CNVZ].[SP][AM].4B | Rt, Rx, Ry | Rt.B3 ← Rx.B3-Ry.B3 | | F3 |
| | | Rt.B2 ← Rx.B2-Ry.B2 | | F2 |
| | | Rt.B1 ← Rx.B1-Ry.B1 | | F1 |
| | | Rt.B0 ← Rx.B0-Ry.B0 | | F0 |
| [TF].SUB.[SP][AM].4B | Rt, Rx, Ry | Do operation only if T/F condition is satisfied in ACF's | | None |
| | | | Octal Bytes | |
| SUB.[SP][AM].8B | Rte, Rxe, Rye | Do operation below but do not affect ACFs | | None |
| SUB[CNVZ].[SP][AM].8B | Rte, Rxe, Rye | Rto.B3 ← Rxo.B3-Ryo.B3 | | F7 |
| | | Rto.B2 ← Rxo.B2-Ryo.B2 | | F6 |
| | | Rto.B1 ← Rxo.B1-Ryo.B1 | | F5 |
| | | Rto.B0 ← Rxo.B0-Ryo.B0 | | F4 |
| | | Rte.B3 ← Rxe.B3-Rye.B3 | | F3 |
| | | Rte.B2 ← Rxe.B2-Rye.B2 | | F2 |
| | | Rte.B1 ← Rxe.B1-Rye.B1 | | F1 |
| | | Rte.B0 ← Rxe.B0-Rye.B0 | | F0 |
| [TF].SUB.[SP][AM].8B | Rte, Rxe, Ry | Do operation only if T/F condition is satisfied in ACFs. | | None |

Arithmetic Scalar Flags Affected (on least significant operation)
C = 1 if a carry occurs, 0 otherwise
N = MSB of result
V = 1 if an overflow occurs, 0 otherwise
Z = 1 if result is zero, 0 otherwise Cycles: 1

FIG. 21A

SHRI - SHIFT RIGHT IMMEDIATE

ENCODING — 2100

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | | DSUopcode | | | | | Rt | | | | | Rx | | | | | Nbits | | | | | DPack | | | CE3 | | |
| | | | | | | | | | | | Rte | | | | | 0 | Rxe | | | | 0 | | | | | | | | | | |

FIG. 21B

Syntax/Operation — 2110

| Instruction | Operands | Operation | ACF |
|---|---|---|---|
| | | | Doubleword |
| SHRI.[SP]D.1[SU]D | Rte, Rxe, Nbits | Do operation below but do not affect ACFs | None |
| SHRI[CNVZ].[SP]D.1[SU].D | Rte, Rxe, Nbits | Rto\|Rte ← Rxo\|Rxe >> Nbits | F3 |
| [TF].SHRI.[SP]D.1[SU].D | Rte, Rxe, Nbits | Do operation only if T/F condition is satisfied in ACFs | None |
| | | | Word |
| SHRI.[SP]D.1[SU]W | Rt, Rx, Nbits | Do operation below but do not affect ACFs | None |
| SHRI[CNVZ].[SP]D.1[SU].W | Rt, Rx, Nbits | Rt ← Rx >> Nbits | F0 |
| SHRI[CNVZ].[SP]D.1[SU].W | Rt, Rx, Nbits | Do operation only if T/F condition is satisfied in ACFs | None |
| | | | Dual Words |
| SHRI.[SP]D.1[SU]W | Rte, Rxe, Nbits | Do operation below but do not affect ACFs | None |
| SHRI[CNVZ].[SP]D.1[SU].W | Rte, Rxe, Nbits | Rto ← Rxo >> Nbits<br>Rte ← Rxe >> Nbits | F1<br>F0 |
| [TF].SHRI.[SP]D.1[SU].W | Rte, Rxe, Nbits | Do operation only if T/F condition is satisfied in ACFs | None |
| | | | Dual Halfwords |
| SHRI.[SP]D.1[SU]H | Rt, Rx, Nbits | Do operation below but do not affect ACFs | None |
| SHRI[CNVZ].[SP]D.1[SU].H | Rt, Rx, Nbits | Rt.H1 ← Rx.H1 >> Nbits<br>Rt.H0 ← Rx.H0 >> Nbits | F1<br>F0 |
| [TF].SHRI.[SP]D.1[SU].H | Rt, Rx, Nbits | Do operation only if T/F condition is satisfied in ACFs | None |
| | | | Quad Halfwords |
| SHRI.[SP]D.1[SU]H | Rte, Rxe, Nbits | Do operation below but do not affect ACFs | None |
| SHRI[CNVZ].[SP]D.1[SU]H | Rte, Rxe, Nbits | Rto.H1 ← Rxo.H1 >> Nbits<br>Rto.H0 ← Rxo.H0 >> Nbits<br>Rte.H1 ← Rxe.H1 >> Nbits<br>Rte.H0 ← Rxe.H0 >> Nbits | F3<br>F2<br>F1<br>F0 |
| [TF].SHRI.[SP]D.1[SU].H | Rte, Rxe, Nbits | Do operation only if T/F condition is satisfied in ACFs | None |

FIG. 22A

SII-STORE INDIRECT WITH SCALED IMMEDIATE UPDATE

ENCODING
⟵ 2200

| 31 30 29 28 | 27 26 25 | 24 | 23 22 | 21 20 19 18 17 16 | 15 14 13 | 12 | 11 | 10 | 9 | 8 | 7 | 6 5 4 3 2 1 0 |
|---|---|---|---|---|---|---|---|---|---|---|---|---|
| Group S/P L/S | 101 | CE1 | Size | 0 Rt / 0 Rte 0 / AtMRt | An | Brcst | Sign Ext | Scale | Pre-Post | Dec/Inc | Imm/Rt =0 | UPDATE7 |

Syntax/Operation (pre-decrement/pre-increment)

| Instruction | Operands | Operation |
|---|---|---|
| | | Store Compute Register |
| SII.[SP].D | Rte,±An, UPDATE7 | An ⟵ An ± (UPDATE7 * 8)<br>Rto\|\|Rte ⟶ Mem[An]dword |
| SII.[SP].W | Rt,±An, UPDATE7 | An ⟵ An ± (UPDATE7 * 4)<br>Rt ⟶ Mem[An]word |
| SII.[SP].H0 | Rt,±An, UPDATE7 | An ⟵ An ± (UPDATE7 * 2)<br>Rt.H0 ⟶ Mem[An]hword |
| SII.[SP].B0 | Rt,±An, UPDATE7 | An ⟵ An ± UPDATE7<br>Rt.B0 ⟶ Mem[An]byte |
| T.SII.[SP].[DWH0B0] | Rt,±An, UPDATE7 | Do operation only if T condition is satisfied in F0 |
| | | Store ARF/MRF Register |
| SII.[SP].W | AtMRt, ± An, UPDATE7 | An ⟵ An ± (UPDATE7 * 4)<br>AtMRt ⟶ Mem[An]word |
| SII.[SP].[H0H1] | AtMRt, ± An, UPDATE7 | An ⟵ An ± (UPDATE7 * 2)<br>AtMRt.Hx ⟶ Mem[An]hword(Note:Hx=H0 or H1) |
| T.SII.[SP].[WH0H1] | AtMRt, ± An, UPDATE7 | Do operation only if T condition is satisfied in F0 |

NOTE: AtMRt is any register except a compute register.
Doubleword access must align on doubleword boundaries.

FIG. 22B-2

Syntax/Operation (post-decrement/post-increment)

| Instruction | Operands | Operation |
|---|---|---|
| | | Store Compute Register |
| S11.[SP].D | Rte,±An, UPDATE7 | Rto\|\|Rte → Mem[An]dword<br>An ← An ± (UPDATE7 * 8) |
| S11.[SP].W | Rt,±An, UPDATE7 | Rt → Mem[An]word<br>An ← An ± (UPDATE7 * 4) |
| S11.[SP].H0 | Rt,±An, UPDATE7 | Rt.H0 → Mem[An]hword<br>An ← An ± (UPDATE7 * 2) |
| S11.[SP].B0 | Rt,±An, UPDATE7 | Rt.B0 → Mem[An]byte<br>An ← An ± UPDATE7 |
| T.SII.[SP].[DWH0B0] | Rt,±An, UPDATE7 | Do operation only if T condition is satisfied in F0 |
| | | Store ARF/MRF Register |
| S11.[SP].W | AtMRt, An ±, UPDATE7 | AtMRt → Mem[An]word<br>An ← An ± (UPDATE7 * 4) |
| S11.[SP].[H0H1] | AtMRt, An ±, UPDATE7 | AtMRt.Hx → Mem[An]hword(Note:Hx=H0 or H1)<br>An ← An ± (UPDATE7 * 2) |
| T.SII.[SP].[WH0H1] | AtMRt, An ±, UPDATE7 | Do operation only if T condition is satisfied in F0 |

NOTE: AtMRt is any register except a compute register.
Doubleword access must align on doubleword boundaries.

Arithmetic Flags Affected
None

Cycles: 1

FIG. 23

| VIM | LOAD | ALU | MAU | DSU | STORE |
|---|---|---|---|---|---|
| 0,E=L | lii.s.d R0,A0+,1 | | | | |
| 1,E=L | lii.s.d R2,A0+,1 | | | | |
| 2,E=LA | lii.s.d R28,A1+,1 | add.sa.2w R4,R30,R30 | | | |
| 3,E=LAM | lii.s.d R28,A1+,1 | add.sa.2w R6,R30,R30 | sum2pa.sm.4sh R4,R0,R28 A'=0*p0+2*p2,B=4*m4+6*m2 | | |
| 4,E=LAM | lii.s.d R28,A1+,1 | add.sa.2w R8,R30,R30 | sum2pa.sm.4sh R8,R0,R28 C'=0*p0+2*m6,D=4*m4+6*m6 | | |
| 5,E=LAM | lii.s.d R28,A1+,1 | add.sa.2w R10,R30,R30 | sum2pa.sm.4sh R6,R2,R28 H'=1*p1+3*p3,G'=5*m1+7*m5 | | |
| 6,E=LMD | lii.s.d R28,A1+,1 | | sum2pa.sm.4sh R10,R2,R28 F'=1*p5+3*m1,E'=5*p3+7*m1 | perm.sd 8b R0,R0,R26 | |
| 7,E=LMD | lii.s.d R28,A1+,1 | | sum2pa.sm.4sh R4,R0,R28 A+=4*p4+6*p6,B+=0*p0+2*p6 | | |
| 8,E=LM | lii.s.d R28,A1+,1 | | sum2pa.sm.4sh R6,R2,R28 H+=5*p5+7*p7,G+=1*p3+3*m7 | perm.sd 8b R2,R2,R26 | |
| 9,E=LM | lii.s.d R28,A1+,1 | | sum2pa.sm.4sh R8,R0,R28 C+=4*p4+6*p2,D+=0*p0+2*m2 | | |
| 10,E=AM | | add.sa.2w R12,R4,R6 0=A+H,1+B+G | sum2pa.sm.4sh R10,R2,R28 F+=5*p7+7*p3,E+=1*p7+3*m5 | | |
| 0,E=LAD | lii.s.d R0,A0+,1 | add.sa.2w R18,R4,R6 7=A-H,6=B-G | | shri.sd.2sw R12,R12,14 | |
| 1,E=LAMDS | lii.s.d R2,A0+,1 | add.sa.2w R14,R8,R10 2=C+F,3=D+E | sub.sm.2w R16,R8,R10 5=C-F,4=D-E | shri.sd.2sw R18,R18,14 | sii.s.h0 R13,A2+,8 |
| 2,E=LADS | lii.s.d R28,A1+,1 | add.sa.2w R4,R0,R28 | | shri.sd.2sw R14,R14,14 | sii.s.h0 R12,A2+,8 |
| 3,E=LAMDS | lii.s.d R28,A1+,1 | add.sa.2w R8,R0,R28 | sum2pa.sm.4sh R4,R0,R28 | shri.sd.2sw R16,R16,14 | sii.s.h0 R15,A2+,8 |
| 4,E=LAMS | lii.s.d R28,A1+,1 | add.sa.2w R6,R30,R30 | sum2pa.sm.4sh R8,R0,R28 | | sii.s.h0 R14,A2+,8 |
| 5,E=LAMS | lii.s.d R28,A1+,1 | add.sa.2w R10,R30,R30 | sum2pa.sm.4sh R6,R2,R28 | perm.sd 8b R0,R0,R26 | sii.s.h0 R16,A2+,8 |
| 6,E=LMDS | lii.s.d R28,A1+,1 | | sum2pa.sm.4sh R10,R2,R28 | | sii.s.h0 R17,A2+,8 |
| 7,E=LMDS | lii.s.d R28,A1+,1 | | sum2pa.sm.4sh R4,R0,R28 | perm.sd 8b R2,R2,R26 | sii.s.h0 R18,A2+,8 |
| 8,E=LMS | lii.s.d R28,A1+,1 | | sum2pa.sm.4sh R6,R2,R28 | | sii.s.h0 R19,A2-,55 |

FIG. 24

| Cycle | VIM | LOAD | ALU | MAU | DSU | STORE |
|---|---|---|---|---|---|---|
| | | DCT 2x2 | | | | C. Kurak |
| | | VLIWs (optimized) | | | | 00 SEP 05 |
| 1 | | lii CC | bflycxs.pa.4sh R10,R1,R3 | | | |
| 2 | | lii CC | bflycxs.pa.4sh R12,R0,R2 | sum2p.pm.4sh R0,R10,R28 | | |
| 3 | | lii CC | bflycxs.pa.4sh R14,R5,R7 | sum2p.pm.4sh R2,R10,R28 | | |
| 4 | | lii CC | bflycxs.pa.4sh R16,R4,R6 | sum2p.pm.4sh R4,R10,R28 | | |
| 5 | | lii CC | | sum2p.pm.4sh R6,R10,R28 | | |
| 6 | | lii CC | | sum2p.pm.4sh R18,R14,R28 | | |
| 7 | | lii CC | | sum2p.pm.4sh R20,R14,R28 | | |
| 8 | | lii CC | | sum2p.pm.4sh R22,R14,R28 | | |
| 9 | | lii CC | | sum2p.pm.4sh R24,R14,R28 | | |
| 10 | | lii CC | | sum2pa.pm.4sh R0,R12,R28 | | |
| 11 | | lii CC | | sum2pa.pm.4sh R18,R16,R28 | | |
| 12 | | lii CC | | sum2pa.pm.4sh R2,R12,R28 | | |
| 13 | | lii CC | bflycxs.pa.4sh R10,R0H1,R18H1 | sum2pa.pm.4sh R20,R16,R28 | PE0 & PE2(pexchg's only) | PE1 & PE3(pexchg's only) |
| 14 | | lii CC | | sum2pa.pm.4sh R4,R12,R28 | pexchg.pd.1w R10,R10 | pexchg.pd.1w R11,R11 |
| 15 | | lii CC | bflycxs.pa.4sh R12,R2H1,R20H1 | sum2pa.pm.4sh R22,R16,R28 | perm.pd.8b R0,R10,R8 | |
| 16 | | lii CC | | sum2pa.pm.4sh R6,R12,R28 | pexchg.pd.1w R12,R12 | pexchg.pd.1w R13,R13 |
| 17 | | lii CC | bflycxs.pa.4sh R14,R4H1,R22H1 | sum2pa.pm.4sh R24,R16,R28 | perm.pd.8b R2,R12,R8 | |
| 18 | | lii CC | | sum2p.pm.4sh R10,R0,R28 | pexchg.pd.1w R14,R14 | pexchg.pd.1w R15,R15 |
| 19 | | lii CC | bflycxs.pa.4sh R16,R6H1,R24H1 | sum2p.pm.4sh R12,R0,R28 | perm.pd.8b R4,R14,R8 | |
| 20 | | lii CC | | sum2p.pm.4sh R14,R2,R28 | pexchg.pd.1w R16,R16 | pexchg.pd.1w R17,R17 |
| 21 | | lii CC | | sum2p.pm.4sh R16,R2,R28 | perm.pd.8b R6,R16,R8 | |
| 22 | | lii CC | | sum2p.pm.4sh R18,R4,R28 | pexchg.pd.2w R0,r0,2x2_SWP1 | |
| 23 | | lii CC | | sum2p.pm.4sh R20,R4,R28 | pexchg.pd.2w R2,r0,2x2_SWP1 | |
| 24 | | lii CC | | sum2p.pm.4sh R22,R6,R28 | pexchg.pd.2w R4,r0,2x2_SWP1 | |
| 25 | | lii CC | | sum2p.pm.4sh R24,R6,R28 | pexchg.pd.2w R6,r0,2x2_SWP1 | |
| 26 | | lii CC | | sum2pa.pm.4sh R10,R0,R28 | | |
| 27 | | lii CC | | sum2pa.pm.4sh R12,R0,R28 | | |
| 28 | | lii CC | | sum2pa.pm.4sh R14,R2,R28 | | |
| 29 | | lii CC | | sum2pa.pm.4sh R16,R2,R28 | packh.pd.4h R0,R10,R12 | |
| 30 | | lii CC | | sum2pa.pm.4sh R18,R4,R28 | | |
| 31 | | lii CC | | sum2pa.pm.4sh R20,R4,R28 | packh.pd.4h R2,R14,R16 | |
| 32 | | lii CC | | sum2pa.pm.4sh R22,R6,R28 | | |
| 33 | | lii CC | | sum2pa.pm.4sh R24,R6,R28 | packh.pd.4h R4,R18,R20 | |
| 34 | | | | | | |
| 35 | | | | | packh.pd.4h R6,R22,R24 | |

2400

METHODS AND APPARATUS FOR EFFICIENT COSINE TRANSFORM IMPLEMENTATIONS

CROSS-REFERENCE TO RELATED APPLICATIONS

The present application claims the benefit of U.S. Provisional Application Serial No. 60/165,337 entitled "Methods and Apparatus for Efficient Cosine Transform Implementations" filed Nov. 12, 1999 which is herein incorporated by reference in its entirety.

FIELD OF THE INVENTION

The present invention relates generally to improvements in parallel processing, and more particularly to methods and apparatus for efficient cosine transform implementations on the manifold array ("ManArray") processing architecture.

BACKGROUND OF THE INVENTION

Many video processing applications, such as the moving picture experts group (MPEG) decoding and encoding standards, use a discrete cosine transform (DCT) and its inverse, the indirect discrete cosine transform (IDCT), in their compression algorithms. The compression standards are typically complex and specify that a high data rate must be handled. For example, MPEG at Main Profile and Main Level specifies 720×576 picture elements (pels) per frame at 30 frames per second and up to 15 Mbits per second. The MPEG Main Profile at High Level specifies 1920×1152 pels per frame at 60 frames per second and up to 80 Mbits per second. Video processing is a time constrained application with multiple complex compute intensive algorithms such as the two dimensional (2D) 8×8 IDCT. The consequence is that processors with high clock rates, fixed function application specific integrated circuits (ASICs), or combinations of fast processors and ASICs are typically used to meet the high processing load. Having efficient 2D 8×8 DCT and IDCT implementations is of great advantage to providing a low cost solution.

Prior art approaches, such as Pechanek et al. U.S. Pat. No. 5,546,336, used a specialized folded memory array with embedded arithmetic elements to achieve high performance with 16 processing elements. The folded memory array and large number of processing elements do not map well to a low cost regular silicon implementation. It will be shown in the present invention that high performance cosine transforms can be achieved with one quarter of the processing elements as compared to the 16 PE Mfast design in a regular array structure without need of a folded memory array. In addition, the unique instructions, indirect VLIW capability, and use of the ManArray network communication instructions allow a general programmable solution of very high performance.

SUMMARY OF THE INVENTION

To this end, the ManArray processor as adapted as further described herein provides efficient software implementations of the IDCT using the ManArray indirect very long instruction word (iVLIW) architecture and a unique data-placement that supports software pipelining between processor elements (PEs) in the 2×2 ManArray processor. For example, a two-dimensional (2D) 8×8 IDCT, used in many video compression algorithms such as MPEG, can be processed in 34-cycles on a 2×2 ManArray processor and meets IEEE Standard 1180-1990 for precision of the IDCT. The 2D 8×8 DCT algorithm, using the same distributed principles covered in the distributed 2D 8×8 IDCT, can be processed in 35-cycles on the same 2×2 ManArray processor. With this level of performance, the clock rate can be much lower than is typically used in MPEG processing chips thereby lowering overall power usage.

An alternative software process for implementing the cosine transforms on the ManArray processor provides a scalable algorithm that can be executed on various arrays, such as a 1×1, a 1×2, a 2×2, a 2×3, a 2×4, and so on allowing scalable performance. Among its other aspects, this new software process makes use of the scalable characteristics of the ManArray architecture, unique ManArray instructions, and a data placement optimized for the MPEG application. In addition, due to the symmetry of the algorithm, the number of VLIWs is minimized through reuse of VLIWs in the processing of both dimensions of the 2D computation.

The present invention defines a collection of eight hardware ManArray instructions that use the ManArray iVLIW architecture and communications network to efficiently calculate the distributed two-dimensional 8×8 IDCT. In one aspect of the present invention, appropriate data distribution and software pipeline techniques are provided to achieve a 34-cycle distributed two-dimensional 8×8 IDCT on a 2×2 ManArray processor that meets IEEE Standard 1180-1990 for precision of the IDCT. In another aspect of the present invention, appropriate data distribution patterns are used in local processor element memory in conjunction with a scalable algorithm to effectively and efficiently reuse VLIW instructions in the processing of both dimensions of the two dimensional algorithm.

These and other advantages of the present invention will be apparent from the drawings and the Detailed Description which follow.

BRIEF DESCRIPTION OF THE DRAWINGS

FIG. 3A illustrates input data in 8×8 matrix form;

FIG. 3B illustrates reordered input 8×8 data matrix per the signal flow graph of FIG. 2;

FIG. 3C illustrates the input 8×8 data matrix after it has been folded on the vertical axis;

FIG. 4 illustrates the data of FIG. 3D as loaded into the four PEs' registers;

FIG. 5A illustrates a presently preferred execute VLIW instruction, XV;

FIG. 5B illustrates the syntax and operation of the XV instruction of FIG. 5A;

FIG. 6A illustrates a presently preferred sum of two products instruction, SUM2P;

FIG. 6B illustrates the syntax and operation of the SUM2P instruction of FIG. 6A;

FIG. 7A illustrates a presently preferred sum of two products accumulate instruction, SUM2PA;

FIG. 7B illustrates the syntax and operation of the SUM2PA instruction of FIG. 7A;

FIG. 8A illustrates a presently preferred butterfly with saturate instruction, BFLYS;

FIG. 8B illustrates the syntax and operation of the BFLYS instruction of FIG. 8A;

FIG. 9A illustrates a presently preferred addition instruction, ADD;

FIG. 9B illustrates the syntax and operation of the ADD instruction of FIG. 9A;

FIG. 10A illustrates a presently preferred permute instruction, PERM;

FIG. 10B illustrates the syntax and operation of the PERM instruction of FIG. 10A;

FIG. 11A illustrates a presently preferred PE to PE exchange instruction, PEXCHG;

FIG. 11B illustrates the syntax and operation of the PEXCHG instruction of FIG. 11A;

FIG. 11C illustrates a 2×2 cluster switch arrangement showing PE and cluster switch notation;

FIG. 11E illustrates the PEXCHG 1×1 Operation Table;

FIG. 11F illustrates the PEXCHG 1×2 Operation Table;

FIG. 11G illustrates the PEXCHG 2×2 Operation Table;

FIG. 11H illustrates a 2×2 PEXCHG operation;

FIG. 12A illustrates a presently preferred load modulo indexed with scaled update instruction, LMX;

FIG. 12B illustrates the syntax and operation of the LMX instruction of FIG. 12A;

FIG. 13A illustrates the first 18-cycles of ManArray 8×8 2D IDCT program code and the VLIWs associated with each XV program instruction; and FIG. 13B illustrates cycles 19–34 of the ManArray 8×8 2D IDCT program code;

FIG. 14 illustrates an 8×8 input data matrix;

FIG. 15 illustrates the intermediate 8×8 results after processing the first dimension of the 8×8 IDCT algorithm;

FIG. 16 illustrates the 8×8 output pixel results after processing of both dimensions of the 8×8 IDCT algorithm;

FIG. 17 illustrates a 1×8 IDCT algorithm in VLIW coding format;

FIGS. 18A–M illustrate 2D 8×8 IDCT ManArray code;

FIG. 19A illustrates a load indirect with scaled immediate update instruction, LII;

FIG. 19B illustrates the syntax and operation of the LII instruction of FIG. 19A;

FIG. 20A illustrates a subtract instruction, SUB;

FIG. 20B illustrates the syntax and operation of the SUB instruction of FIG. 20A;

FIG. 21A illustrates a shift right immediate instruction, SHRI;

FIG. 21B illustrates the syntax and operation of the SHRI instruction of FIG. 21A;

FIG. 22A illustrates a store indirect with scaled immediate update instruction, SII;

FIG. 22B illustrates the syntax and operation of the SII instruction of FIG. 22A;

FIG. 23 illustrates exemplary 2D 8×8 IDCT code showing the software pipeline operation; and FIG. 24 illustrates an exemplary process for a 2×2 DCT.

DETAILED DESCRIPTION

Figure 1:
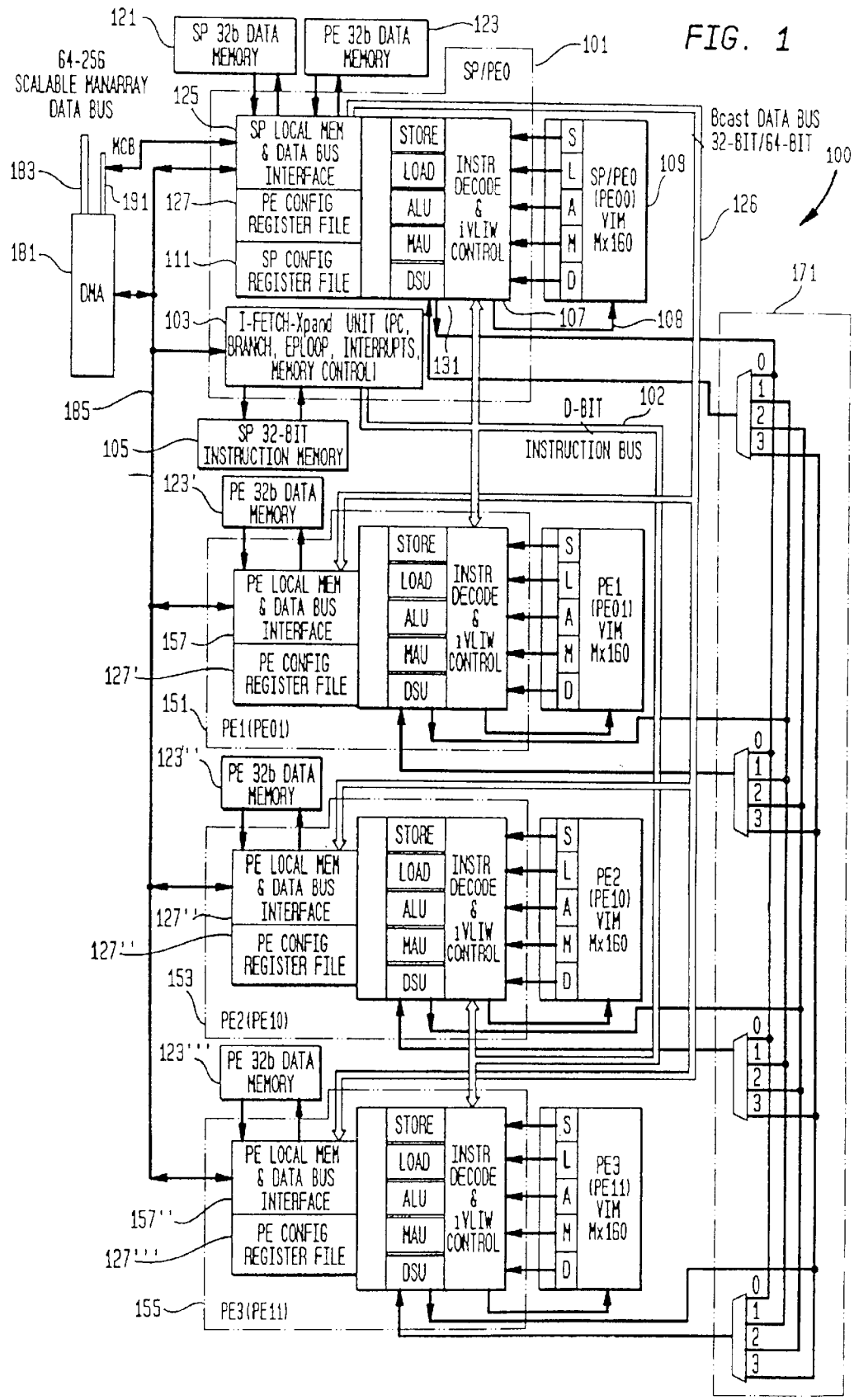
FIG. 1 illustrates an exemplary 2×2 ManArray iVLIW processor.

Further details of a presently preferred ManArray architecture for use in conjunction with the present invention are found in U.S. patent application Ser. No. 08/885,310 filed Jun. 30, 1997, now U.S. Pat. No. 6,023,753, U.S. patent application Ser. No. 08/949,122 filed Oct. 10, 1997, now U.S. Pat. No. 6,167,502, U.S. patent application Ser. No. 09/169,255 filed Oct. 9, 1998, now U.S. Pat. No. 6,343,356, U.S. patent application Ser. No. 09/169,256 filed Oct. 9, 1998, now U.S. Pat. No. 6,167,501, U.S. patent application Ser. No. 09/169,072, filed Oct. 9, 1998, now U.S. Pat. No. 6,219,776, U.S. patent application Ser. No. 09/187,539 filed Nov. 6, 1998, now U.S. Pat. No. 6,151,668, U.S. patent application Ser. No. 09/205,588 filed Dec. 4, 1998, now U.S. Pat. No. 6,173,389, U.S. patent application Ser. No. 09/215,081 filed Dec. 18, 1998, now U.S. Pat. No. 6,101,592, U.S. patent application Ser. No. 09/228,374 filed Jan. 12, 1999 now U.S. Pat. No. 6,216,223, U.S. patent application Ser. No. 09/238,446 filed Jan. 28, 1999, now U.S. Pat. No. 6,366,999, U.S. patent application Ser. No. 09/267,570 filed Mar. 12, 1999, now U.S. Pat. No. 6,446,190, U.S. patent application Ser. No. 09/350,191 filed Jul. 9, 1999, now U.S. Pat. No. 6,356,994, U.S. patent application Ser. No. 09/422,015 filed Oct. 21, 1999 now U.S. Pat. No. 6,408,382, U.S. patent application Ser. No. 09/432,705 filed Nov. 2, 1999 entitled "Methods and Apparatus for Improved Motion Estimation for Video Encoding", U.S. patent application Ser. No. 09/471,217 filed Dec. 23, 1999 entitled "Methods and Apparatus for Providing Data Transfer Control", U.S. patent application Ser. No. 09/472,372 filed Dec. 23, 1999, now U.S. Pat. No. 6,256,683, U.S. patent application Ser. No. 09/596,103 filed Jun. 16, 2000, now U.S. Pat. No. 6,397,324, U.S. patent application Ser. No. 09/598,567 entitled "Methods and Apparatus for Improved Efficiency in Pipeline Simulation and Emulation" filed Jun. 21, 2000, U.S. patent application Ser. No. 09/598,564 filed Jun. 21, 2000, now U.S. Pat. No. 6,622,238, U.S. patent application Ser. No. 09/598,566 entitled "Methods and Apparatus for Generalized Event Detection and Action Specification in a Processor" filed Jun. 21, 2000, and U.S. patent application Ser. No. 09/599,980 entitled "Methods and Apparatus for Parallel Processing Utilizing a Manifold Array (ManArray) Architecture and Instruction Syntax" filed Jun. 2, 2000, as well as, Provisional Application Serial No. 60/113,637 entitled "Methods and Apparatus for Providing Direct Memory Access (DMA) Engine" filed Dec. 23, 1998, Provisional Application Serial No. 60/113,555 entitled "Methods and Apparatus Providing Transfer Control" filed Dec. 23, 1998, Provisional Application Serial No. 60/139,946 entitled "Methods and Apparatus for Data Dependent Address Operations and Efficient Variable Length Code Decoding in a VLIW Processor" filed Jun. 18, 1999, Provisional Application Serial No. 60/140,245 entitled "Methods and Apparatus for Generalized Event Detection and Action Specification in a Processor" filed Jun. 21, 1999, Provisional Application Serial No. 60/140,163 entitled "Methods and Apparatus for Improved Efficiency in Pipeline Simulation and Emulation" filed Jun. 21, 1999, Provisional Application Serial No. 60/140,162 entitled "Methods and Apparatus for Initiating and Re-Synchronizing Multi-Cycle SIMD Instructions" filed Jun. 21, 1999, Provisional Application Serial No. 60/140,244 entitled "Methods and Apparatus for Providing One-By-One Manifold Array (1×1 ManArray) Program Context Control" filed Jun. 21, 1999, Provisional Application Serial No. 60/140,325 entitled "Methods and Apparatus for Establishing Port Priority Function in a VLIW Processor" filed Jun. 21, 1999, Provisional Application Serial No. 60/140,425 entitled "Methods and Apparatus for Parallel Processing Utilizing a Manifold Array (ManArray) Architecture and Instruction Syntax" filed Jun. 22, 1999, Provisional Application Serial No. 60/165,337 entitled "Efficient Cosine Transform Implementations on the ManArray Architecture" filed Nov. 12, 1999, and Provisional Application Serial No. 60/171,911 entitled "Methods and Apparatus for DMA Loading of Very Long Instruction Word Memory" filed Dec. 23, 1999, Provisional Application Serial No. 60/184,668 entitled "Methods and Apparatus for Providing Bit-Reversal and Multicast Functions Utilizing DMA Controller" filed Feb. 24, 2000, Provisional Application Serial No. 60/184,529 entitled "Methods and Apparatus for Scalable Array Processor Interrupt Detection and Response" filed Feb. 24, 2000, Provisional Application Serial No. 60/184,560 entitled "Methods and Apparatus for Flexible Strength Coprocessing Interface" filed Feb. 24, 2000, Provisional Application Serial No. 60/203,629 entitled "Methods and Apparatus for Power Control in a Scalable Array of Processor Elements" filed May 12, 2000, respectively, all of which are assigned to the assignee of the present invention and incorporated by reference herein in their entirety.

In a presently preferred embodiment of the present invention, a ManArray 2×2 iVLIW single instruction multiple data stream (SIMD) processor 100 shown in FIG. 1 comprises a sequence processor (SP) controller combined with a processing element-0 (PE0) SP/PE0 101, as described in further detail in U.S. patent application Ser. No. 09/169,072 entitled "Methods and Apparatus for Dynamically Merging an Array Controller with an Array Processing Element". Three additional PEs 151, 153, and 155, are also utilized to demonstrate the efficient algorithm and mechanisms for fast cosine transforms on the ManArray architecture in accordance with the present invention. It is noted that PEs can also be labeled with their matrix positions as shown in parenthesis for PE0 (PE00) 101, PE1 (PE01) 151, PE2 (PE10) 153, and PE3 (PE11) 155. The SP/PE0 101 contains the fetch controller 103 to allow the fetching of short instruction words (SIWs) from a 32-bit instruction memory 105. The fetch controller 103 provides the typical functions needed in a programmable processor such as a program counter (PC), branch capability, event point (EP) loop operations (see U.S. application Ser. No. 09/598,556 entitled "Methods and Apparatus for Generalized Event Detection and Action Specification in a Processor" filed Jun. 21, 2000 and claiming the benefit of U.S. Provisional Application Serial No. 60/140,245 for further details), and support for interrupts. It also provides the instruction memory control which could include an instruction cache if needed by an application. In addition, the SIW I-Fetch controller 103 dispatches 32-bit SIWs to the other PEs in the system by means of the 32-bit instruction bus 102.

In this exemplary system, common elements are used throughout to simplify the explanation, though actual implementations are not limited to this restriction. For example, the execution units 131 in the combined SP/PE0 101 can be separated into a set of execution units optimized for the control function, e.g., fixed point execution units, and the PE0 as well as the other PEs can be optimized for a floating point application. For the purposes of this description, it is assumed that the execution units 131 are of the same type in the SP/PE0 and the PEs. In a similar manner, SP/PE0 and the other PEs use a five instruction slot iVLIW architecture which contains a very long instruction word memory (VIM) 109 and an instruction decode and VIM controller function unit 107 which receives instructions as dispatched from the SP/PE0's I-Fetch unit 103 and generates the VIM addresses-and-control signals 108 required to access the iVLIWs stored in VIM. Referenced instruction types are identified by the letters SLAMD in VIM 109, where the letters are matched up with instruction types as follows: Store (S), Load (L), ALU (A), MAU (M), and DSU (D). The basic concept of loading of the iVLIWs is described in greater detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common PE configurable register file 127 which is described in further detail in U.S. patent application Ser. No. 09/169,255 entitled "Methods and Apparatus for Dynamic Instruction Controlled Reconfiguration Register File with Extended Precision".

Due to the combined nature of the SP/PE0, the data memory interface controller 125 must handle the data processing needs of both the SP controller, with SP data in memory 121, and PE0, with PE0 data in memory 123. The SP/PE0 controller 125 also is the controlling point of the data that is sent over the 32-bit broadcast data bus 126. The other PEs, 151, 153, and 155 contain common physical data memory units 123', 123", and 123'" though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171 various aspects of which are described in greater detail in U.S. patent application Ser. No. 08/885,310 entitled "Manifold Array Processor", U.S. application Ser. No. 09/949,122 entitled "Methods and Apparatus for Manifold Array Processing", and U.S. application Ser. No. 09/169,256 entitled "Methods and Apparatus for ManArray PE-to-PE Switch Control". The interface to a host processor, other peripheral devices, and/or external memory can be done in many ways. For completeness, a primary interface mechanism is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface symbolically represented by 185. A high level view of the ManArray Control Bus (MCB) 191 is also shown in FIG. 1.

All of the above noted patents are assigned to the assignee of the present invention and incorporated herein by reference in their entirety.

Inverse Discrete Cosine Transform $$p(x, y) = \sum_{u=0}^{7} \sum_{v=0}^{7} \frac{C(u)}{2} \frac{C(v)}{2} f(u, v) \cos\left[(2x+1)u\frac{\pi}{16}\right] \cos\left[(2y+1)v\frac{\pi}{16}\right]$$

The 2D 8×8 IDCT equation is given as:

Where: $C(u)=1/\sqrt{2}$ for $u=0$ $C(u)=1$ for $u>0$ $C(v)=1/\sqrt{2}$ for $v=0$ $C(v)=1$ for $v>0$ $f(u,v)$=2D DCT coefficient $p(x,y)$=2D result value This 2D 8×8 IDCT matrix can be separated into 1D 1×8 IDCTs on the rows and columns. The ManArray 2D 8×8 IDCT uses this property and applies the following 1D 1×8 IDCT on all eight rows (columns) followed by applying it to all eight columns (rows).

$$p(x) = \sum_{u=0}^{7} \frac{C(u)}{2} f(u) \cos\left[(2x+1)u\frac{\pi}{16}\right]$$

Where:

$C(u) = 1/\sqrt{2}$ for $u = 0$ $C(u) = 1$ for $u > 0$ $F(u) = $ 1D DCT coefficient $P(x) = $ 1D result value The calculation of the 2D 8×8 IDCT in 34-cycles does not include the loading of data into the processing elements of the array since the equation does not account for a data loading function and there are many methods to accomplish the data loading such as direct memory access (DMA) and other means as dictated by the application program. For example, in an MPEG decoders compressed encoded data is received and sequentially preprocessed by variable length decoding, run length and inverse scan steps and then placed in the PEs after which the data is further processed by an inverse quantization step prior to using the IDCT processing step. This IDCT algorithm can also be used in an MPEG encoder and other applications requiring an IDCT function.

Figure 2:
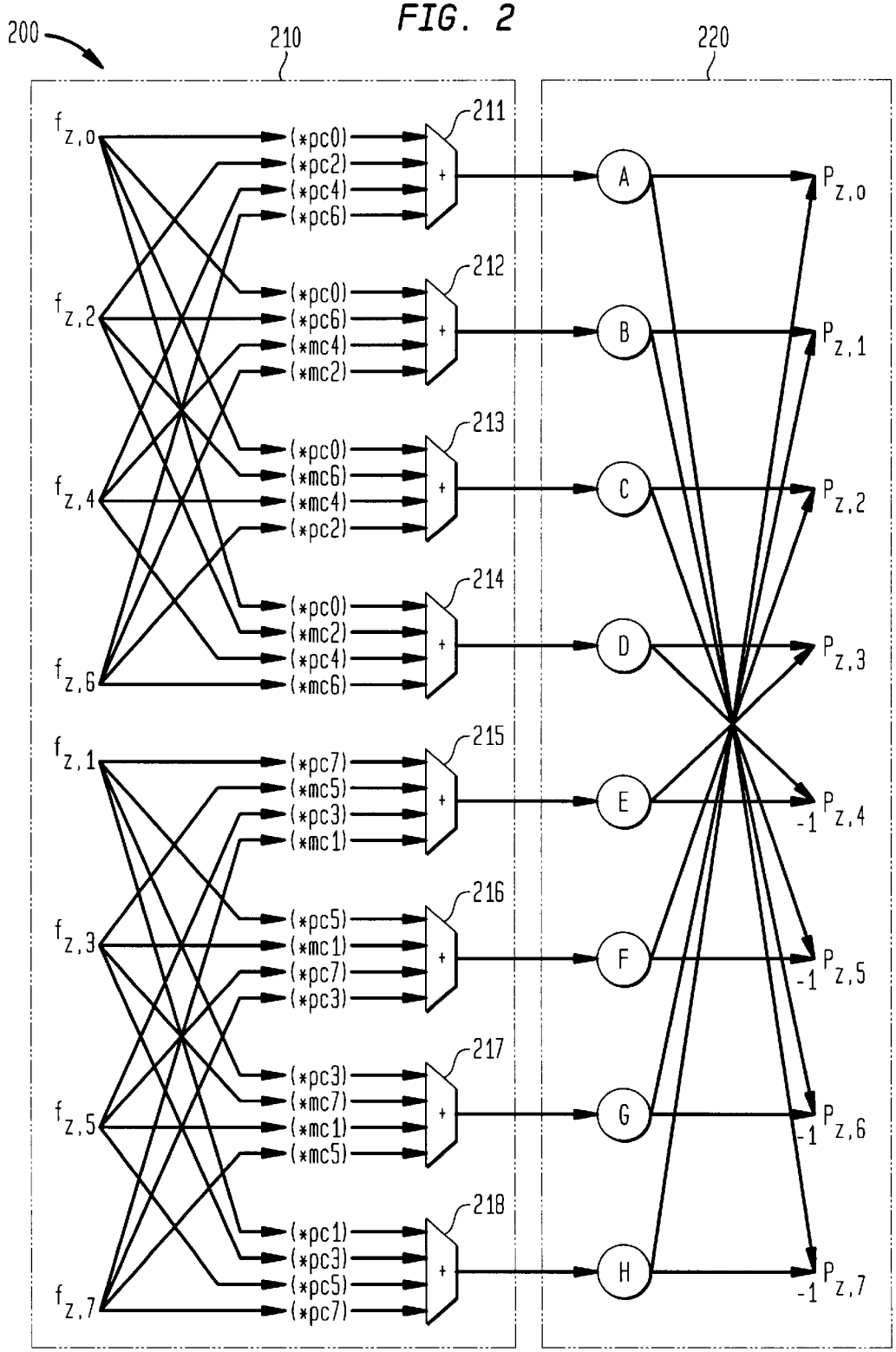
FIG. 2 illustrates an IDCT signal flow graph.

For the fast IDCT ManArray 2×2 approach of the present invention, the data is uniquely placed in the four PEs based upon symmetric properties of the IDCT signal flow graph as shown in FIG. 2. The present approach separates the 2-dimensional 8×8 IDCT into 1-dimensional 1×8 IDCTs on the rows and then on the columns. The symmetric form of the 1×8 IDCT was used in a prior art processor further described in a paper "M.F.A.S.T.: A Highly Parallel Single Chip DSP with a 2D IDCT Example", by G. Pechanek, C. W. Kurak., C. J. Glossner, C. H. L. Moller, and S. J. Walsh. The approach described in the M.F.A.S.T. article required a special folding of the data on the diagonal of the data matrix to determine the data placement for the diagonally folded 4×4 M.F.A.S.T. array of 16-processing elements to accomplish the 2D 8×8 IDCT processing in 18–22 cycles. The present invention describes a 2D 8×8 IDCT algorithm on a 4-processing element array in 34-cycles, a performance that is less than twice the processing time with only one quarter of the processing elements as compared to the M.F.A.S.T. processor. In addition, no special folding of the data matrix on the diagonal is required. The present ManArray™ approach uses a data placement that matches the signal flow graph directly.

FIG. 2 illustrates a signal flow graph 200 for a symmetric 1×8 IDCT operation in accordance with the present invention in which the input data elements are row elements given as $f_{zj}$ where $z=\{0,1, \ldots ,7\}$=row identifier and $j=\{0, 1, \ldots ,7\}$=column identifier. The 1×8 IDCT is composed of a sum of products stage-1 210 and a butterfly stage-2 220. The stage-1 operation consists of 32 multiply operations indicated by the input being multiplied (*) by cosine coefficients indicated by a "pc#" where p indicates a positive value or "mc#" where m indicates a negative value. Groups of four multiplied values are then summed as indicated in the signal flow graph by the eight 4-input adders 211–218. The sum of product results are identified by the letters A–H. These values are then processed by butterfly operations in stage 220 to generate the output values $P_{zj}$ where $z=\{0, 1, \ldots ,7\}$=row identifier and $j=\{0,1, \ldots ,7\}$=column identifier. This 1×8 IDCT operation is performed on each row of the 8×8 input data followed by the 1×8 IDCT operation on each column to form the final two-dimensional result.

The input data is shown in FIG. 3A in a row-major matrix 300 where in an MPEG decoder each element represents a DCT coefficient as processed through the variable length decoder. The data types are assumed to be greater than 8-bits at this stage and for ManArray processing 16-bit data types are used for each element. The data elements are identified in both a linear numeric ordering from M0 to M63, and a row and column matrix form corresponding to the input notation used in the signal flow graph 200 of FIG. 2. The data is to be distributed to the PEs of the 2×2 ManArray processor 100 appropriately to allow fast execution as a distributed 2D 8×8 IDCT. Consequently, the data should be distributed among the four PEs to minimize communication operations between the PEs. To discover an appropriate data distribution pattern, it is noted that the input data of the FIG. 2 signal flow graph separates the even data elements from the odd data elements. This even and odd arrangement 310 of the data is shown graphically in FIG. 3B where the rows and columns are ordered in the same even and odd arrangement used in FIG. 2.

Figure 3D:
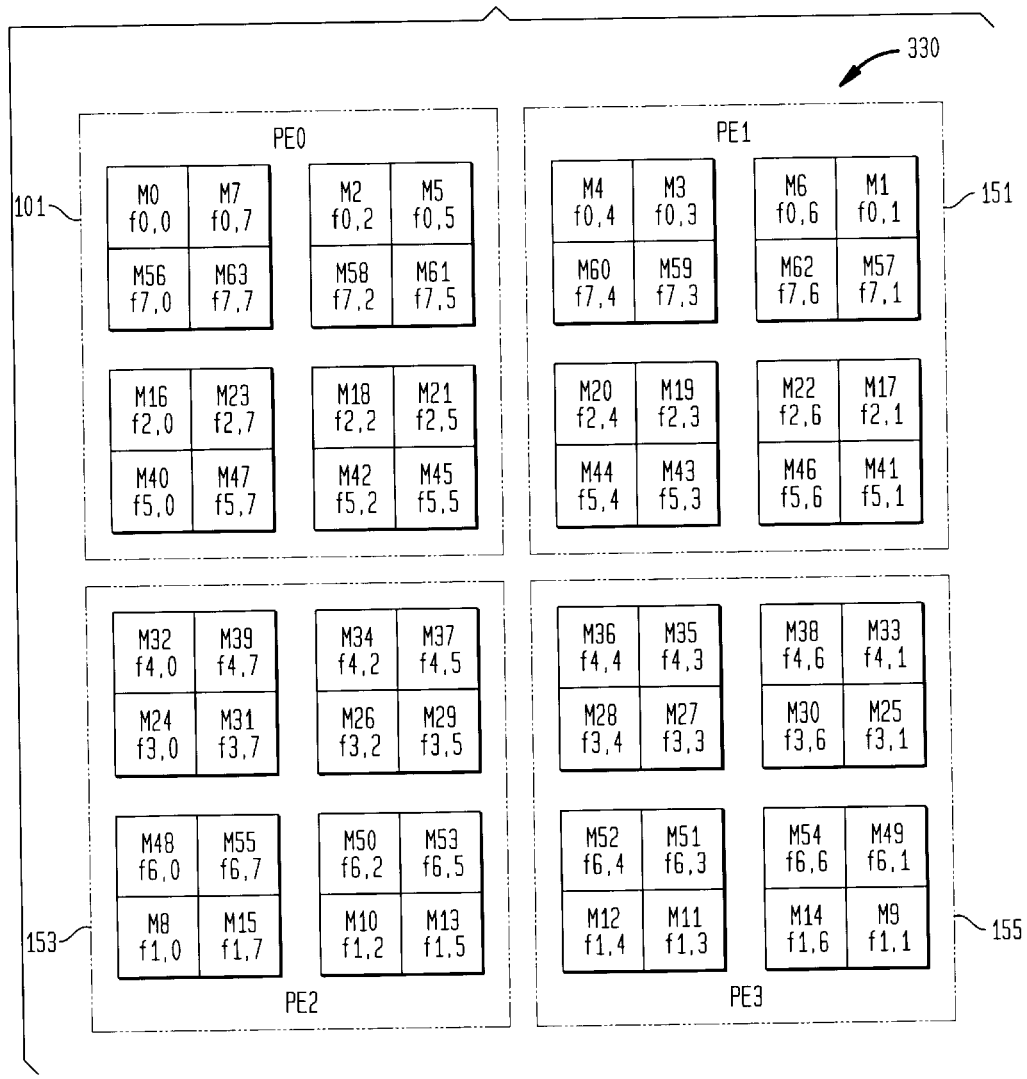
FIG. 3D illustrates the input 8×8 data matrix after it has been folded on the horizontal axis with data placement per PE in the 2×2 ManArray iVLIW processor of FIG. 1.
Figure 3E:
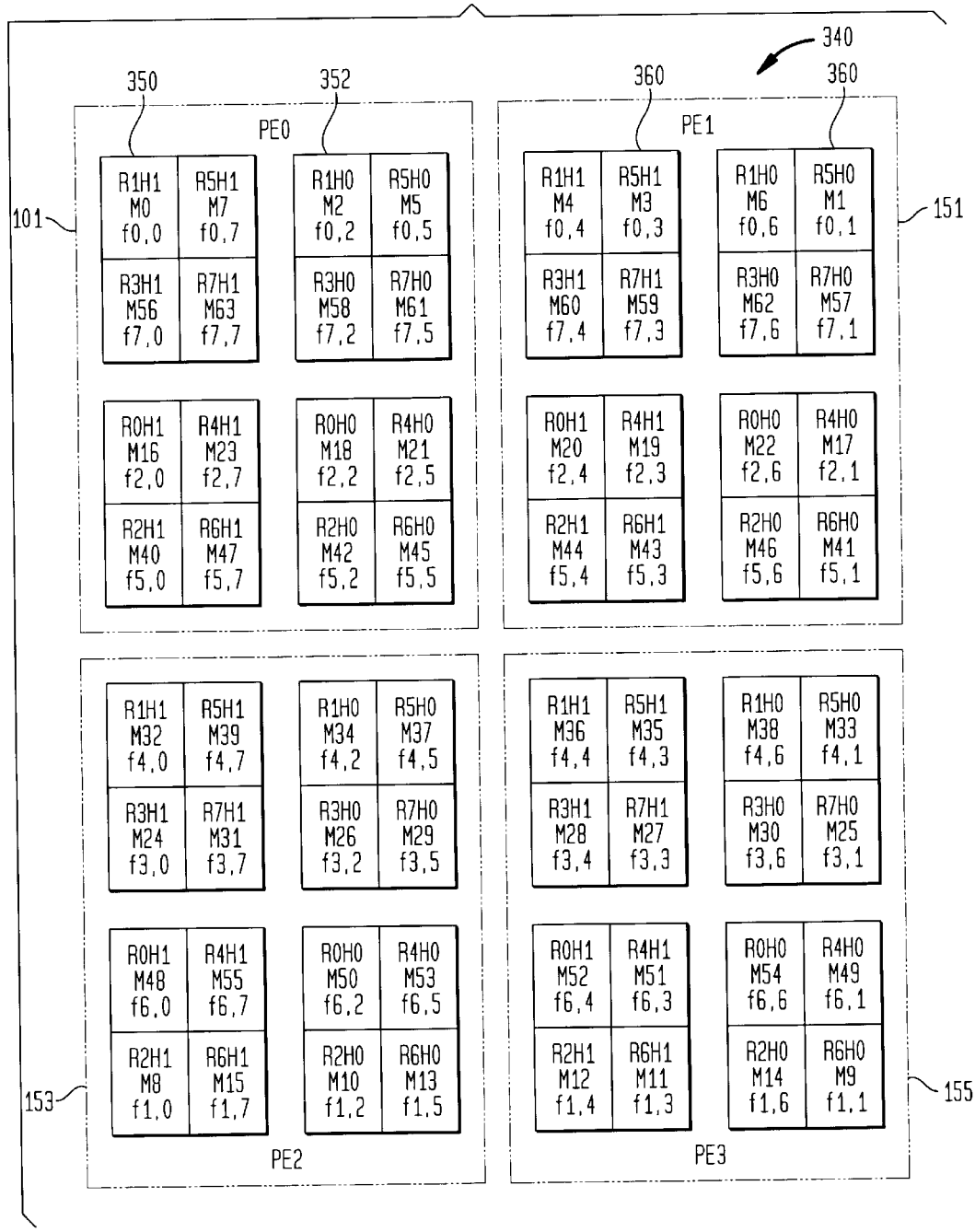
FIG. 3E illustrates an example of data placement into the ManArray PE compute register files.

It is next noted that the second stage 220 of the signal flow graph 200 of FIG. 2 is a butterfly operation. For example, $P_{z,1}=B+G$ while $P_{z,6}=B-G$. The butterfly processing requires A and H, B and G, C and F, D and E values to be located locally on a PE. This is equivalent to folding the signal flow graph and is further equivalent to folding the input data matrix. Since the 2D 8×8 IDCT operation first operates on the rows (columns) and then the columns (rows), two folds on two different axis must be accounted for. A vertical axis data fold 320 is illustrated in FIG. 3C, while FIG. 3D shows data 330 corresponding to the data of FIG. 3C folded again on the horizontal axis. FIG. 3D further shows how the data would be assigned to the 4 PEs, PE0–PE3, of the 2×2 ManArray processor 100 of FIG. 1. There are a number of ways the data can be loaded into the PEs. For example, in an MPEG decoder, the output of the variable length decoder (VLD) could be in a linear order of 64 packed halfword data elements, two DCT coefficients per word. This packed format is organized to match the packed format required in the IDCT step. The data is then loaded via DMA operation or by using ManArray load instructions. The data is loaded into the PE configurable compute register file which is used in a 16×64 configuration for high performance packed data operations. Such a data placement 340 is shown in FIG. 3E for each PE and the registers chosen for this description. Within each PE, the even-indexed 16-bit data values are placed together in a compute register file (CRF) high halfword (H1) and low halfword (H0) 32-bit register, for example, register blocks 350 and 352 of FIG. 3E. In the same manner, the odd-indexed 16-bit data values are placed together in a CRF high halfword (H1) and low halfword (H0) 32-bit register, for example, register blocks 360 and 362 of FIG. 3E. This data placement supports the signal flow graph of FIG. 2 where the even-indexed input values and odd-indexed input values provide two independent sets of inputs for the sum of product operations. For example, the four sum of product values A, B, C and D are generated from only the even-indexed input values. The register data placement of FIG. 3E is shown in a compute register file format 400 in FIG. 4. It is noted that a number of different register choices are possible while still achieving the same performance and using the same processing approach. It is further noted that different data orderings that allow the same efficient sum of four products operation are also possible while still achieving the same performance and using the inventive approach.

In a presently preferred embodiment, the strategy for processing the IDCT algorithm is implemented using a number of features of the ManArray processor to provide a unique software pipeline employing indirect VLIWs operating in multiple PEs. For example, the indirect execute VLIW (XV) instruction 500 shown in FIG. 5A has a unique enable feature, E=SLAMD specified in bits 14–10, which allows a software pipeline to be built up or torn down without creating new VLIWs. A syntax/operation table 510 for the XV instruction 500 is shown in FIG. 5B.

Quad 16×16 multiplications are used in the sum of two products with and without accumulate instructions to produce two 32-bit results. These instructions 600 and 700 are shown in FIGS. 6A and 7A. Their syntax/operation tables 610 and 710 are shown in FIGS. 6B and 7B. The use of common instructions that can execute in either the ALU or MAU or both, for example the butterfly with saturate instruction 800 of FIG. 8, improves performance. A syntax/operation table 810 for BFLYS instruction 800 is shown in FIG. 8B. Other instructions common to the MAU and ALU include ADD instruction 900 of FIG. 9A having syntax/operation table 910 of FIG. 9B, add immediate (ADDI), add with saturate (ADDS), butterfly divide by 2 (BFLYD2), butterfly with saturate (BFLYS), the mean of two numbers (MEAN2), subtract (SUB), subtract immediate (SUBI), and subtract with saturate (SUBS). In addition, the DSU supports permute instructions 1000 (PERM) of FIG. 10A having syntax/operation 1010 of FIG. 10B to aid in organizing the data prior to processing and communicating between PEs by use of the PEXCHG instruction 1100 of FIG. 11A having syntax/operation table 1110 of FIG. 11B. The PEX-CHG instruction 1100 used in the IDCT algorithm swaps two data items between two PEs. The loading of the cosine coefficients is accomplished with a load modulo indexed with scaled update instruction 1200 (LMX) of FIG. 12 having syntax/operation table 1210 of FIG. 12B.

Figure 10C:
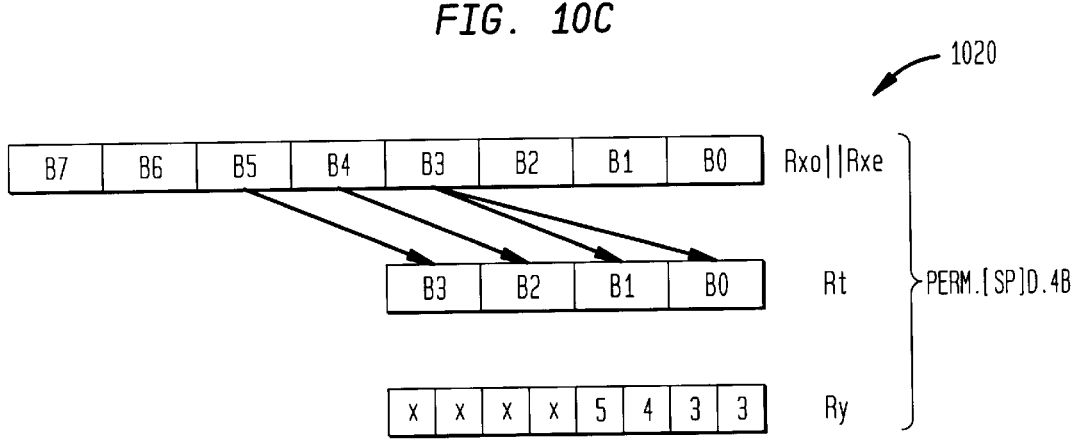
FIG. 10C illustrates one example of an 8-byte to 4-byte permute operation.
Figure 10D:
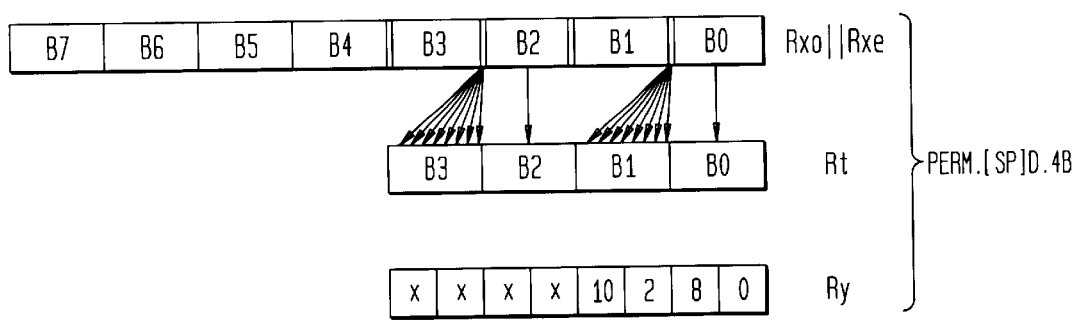
FIG. 10D illustrates another example of an 8-byte to 4-byte permute operation.
Figure 10E:
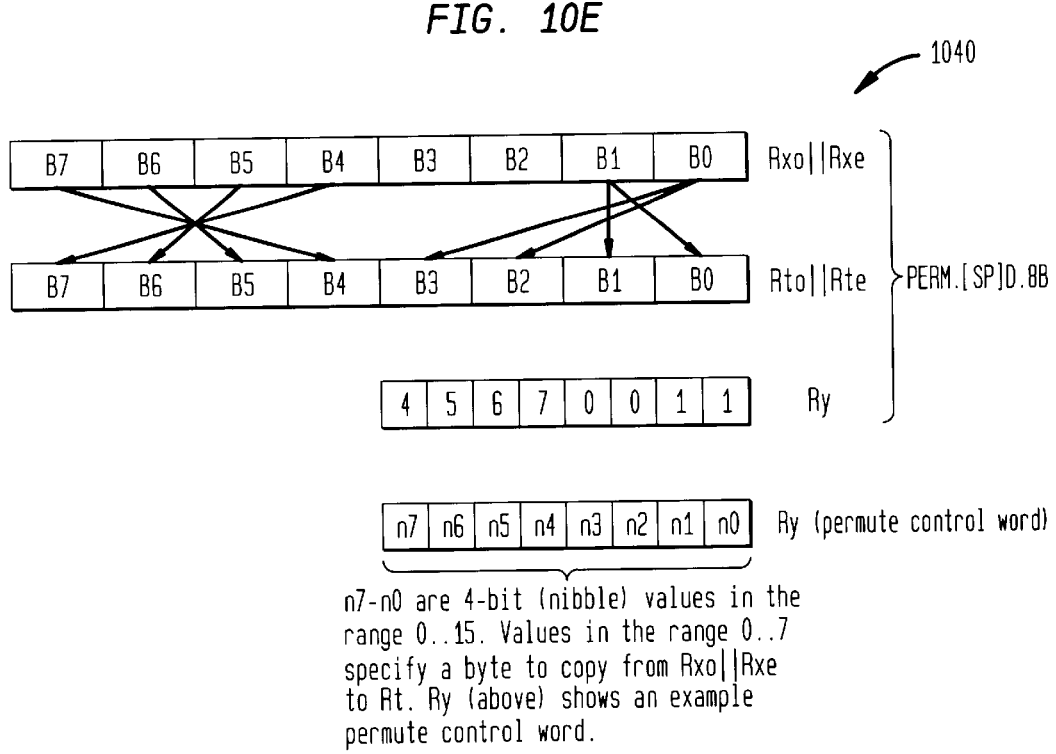
FIG. 10E illustrates one example of an 8-byte to 8-byte permute operation.
Figure 11D:
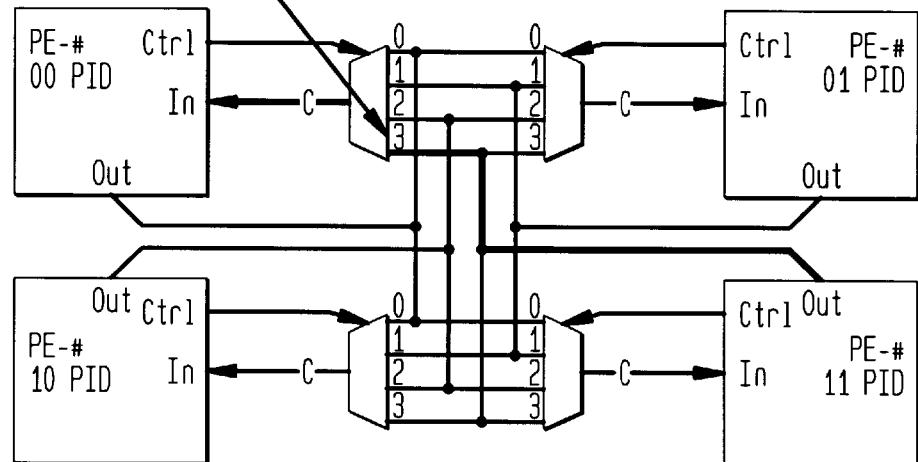
FIG. 11D illustrates a key to PEXCHG 2×2 Operation Table with an example path highlighted.
Figure 11H:
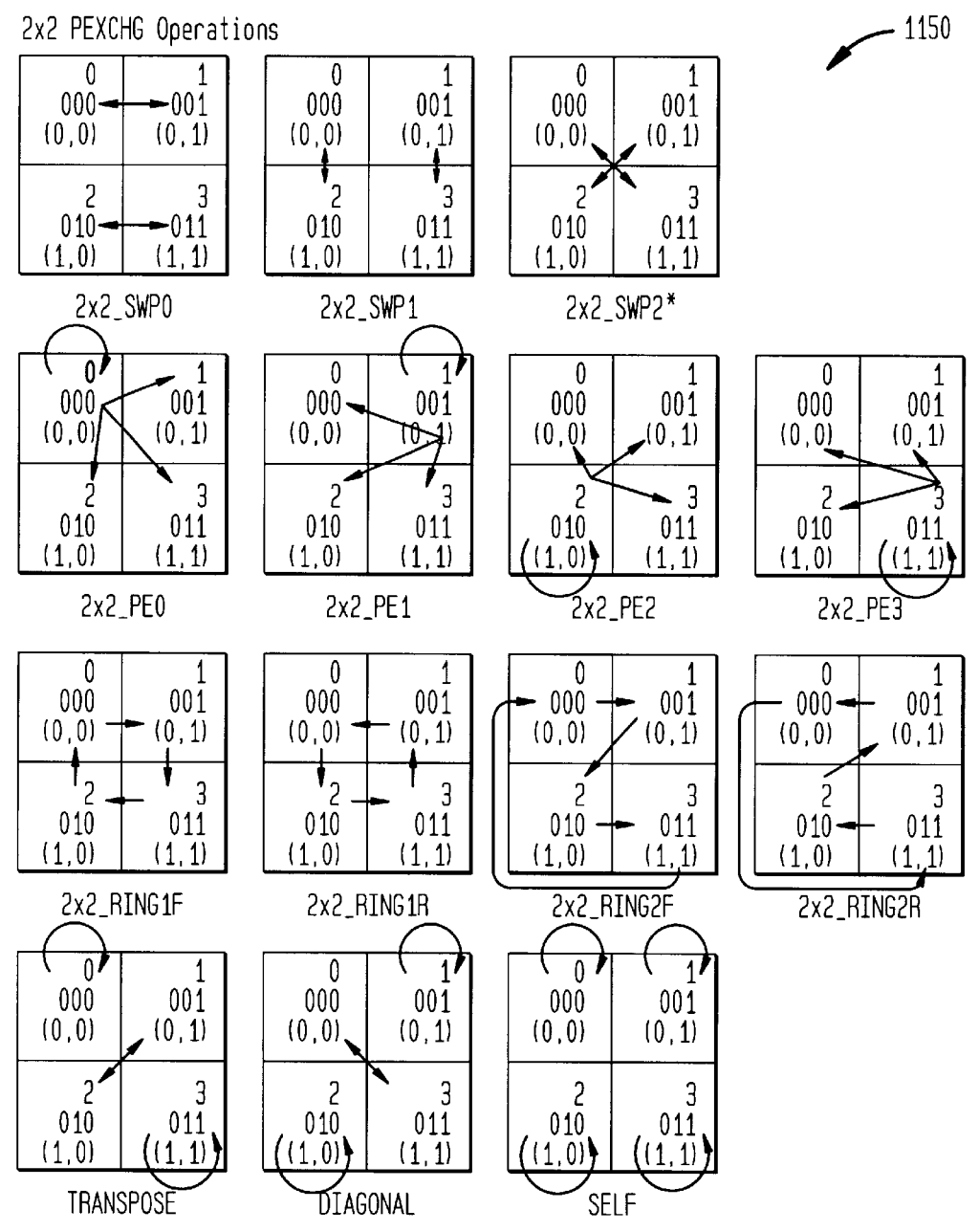

As addressed further below, additional aspects of the present invention are illustrated in FIGS. 10C–10E and FIGS. 11C–11H as follows. FIG. 10C illustrates one example of an 8-byte to 4-byte permute operation 1020. FIG. 10D illustrates another example of an 8-byte to 4-byte permute operation 1030. FIG. 10E illustrates an example of an 8-byte to 8-byte permute operation 1040. FIG. 11C illustrates a 2×2 cluster switch arrangement 1130 showing PE and cluster switch notation. FIG. 11D illustrates a key to PEXCHG 2×2 operation table 1140. FIGS. 11E–11G illustrates PEXCHG 1×1, 1×2 and 2×2 operation tables, 1160, 1170 and 1180, respectively. FIG. 11H illustrates a 2×2 PEXCHG operation 1150.

Prior to beginning the IDCT process, the frequency or DCT coefficient data and the first set of cosine coefficients are loaded onto the four PEs, some pointers and control values are initialized, and a rounding bit is used to enhance the precision of the results is loaded. The IDCT signal flow graph 200 for each row (column), FIG. 2, begins with a sum of products operation consisting of thirty-two 16×16 multiplications and twenty-four 2-to-1 32-bit additions for each row (column) processed. The ManArray IDCT algorithm maintains maximum precision through the sum-of-products operation. The second stage of the ID IDCT signal flow graph for each of the eight rows (columns) of processing illustrated in FIG. 2 uses four butterfly operations where each butterfly operation consists of a separate add and subtract on 16-bit data. At this point in the ManArray IDCT process, the most significant 16-bits of the 32-bit sum-of-product data are operated on producing the final 1×8 IDCT results in 16-bit form. A total of 32 butterfly operations are required for the eight rows (columns) which is accomplished in four cycles on the 2×2 array using the BFLYS instruction since its execution produces two butterfly operations per PE. Many of these butterfly operations are overlapped by use of VLIWs with other IDCT computation to improve performance. The 1×8 IDCT operations are now repeated on the columns (rows) to complete the 2D 8×8 IDCT. The load unit (LU) is also busy supporting the IDCT computations by loading the appropriate data cycle by cycle.

To provide further details of these operations, the 8×8 2D IDCT program 1300 shown in FIGS. 13A and 13B is discussed below. The first column 1305 labeled Clk indicates the program instruction execution cycle counts. FIG. 13A depicts steps or cycles 1–18 for the program 1300 and FIG. 13B depicts steps or cycles 19–34 of that program. These illustrated steps are made up primarily of 32-bit XV instructions listed under the column 1310 titled 8×8 2D IDCT program. For VLIW slot instructions, such as instruction 1341 in column 1340 of FIG. 13A or instruction 1342 in column 1340 of FIG. 13B, the instructions are struck out or crossed through. In these instances, the instructions shown are located in VLIW memory, but are not enabled by the E=parameter of the XV instruction that selects that VLIW for execution. Column 1310 lists the actual program stored in 32-bit instruction memory. The VLIWs which the XVs indirectly selected for execution are stored in the local PE VIMs. The other columns 1320, 1330, 1340, 1350 and 1360 represent the SLAMD VLIWs that are indirectly executed with each XV instruction. The XV syntax 510 of FIG. 5B and used in column 1310 of FIGS. 13A and 13B is as follows: XV is the base mnemonic, p indicates this is a PE instruction, V0 selects the V0 VIM base address register, # represents the VIM offset value added to V0 to create the VIM VLIW address, the E=SLAMD indicates which execution units are enabled for that execution cycle, and F=AMD indicates the unit affecting flags selection option. Note that with the E=SLAMD option VLIWs can sometimes be reused as in this IDCT algorithm where the first six XVs Clk=1, 2, . . . 6 are repeated in XVs Clk=9, 10, . . . 14 respectively and differ in use by appropriate choice of the E=enabled unit. For the anticipated use of this ManArray IDCT algorithm, no store operations are required and all store units have a no operation (nop) indicated in each VLIW.

The instructions used in the program are described in further detail as follows:

The XV instruction 500 is used to execute an indirect VLIW (iVLIW). The iVLIWs that are available for execution by the XV instruction are stored at individual addresses of the specified SP or PE VLIW memory (VIM). The VIM address is computed as the sum of a base VIM address register Vb (V0 or V1) plus an unsigned 8-bit offset VIMOFFS. The VIM address must be in the valid range for the hardware configuration otherwise the operation of this instruction is undefined. Any combination of individual instruction slots may be executed via the execute slot parameter 'E={SLAMD}', where S=store unit (SU), L=load unit (LU), A=arithmetic logic unit (ALU), M=multiply accumulate unit (MAU), D=data select unit (DSU). A blank 'E=' parameter does not execute any slots. The unit affecting flags (UAF) parameter 'F=[AMDN]' overrides the UAF specified for the VLIW when it was loaded via the LV instruction. The override selects which arithmetic instruction slot (A=ALU, M=MAU, D=DSU) or none (N=NONE) is allowed to set condition flags for this execution of the VLIW. The override does not affect the UAF setting specified via the LV instruction. A blank 'F=' selects the UAF specified when the VLIW was loaded.

The SUM2P instruction 600 operation version 610: The product of the high halfwords of the even and odd source registers (Rxe, Rxo) and (Rye, Ryo) are added to the product of the low halfwords of the even and odd source registers (Rxe, Rxo) and (Rye, Ryo) and the results are stored in the even and odd target register (Rte, Rto).

The SUM2PA instruction 700 operation version 710: The product of the high halfwords of the even and odd source registers (Rxe, Rxo) and (Rye, Ryo) are added to the product of the low halfwords of the even and odd source registers (Rxe, Rxo) and (Rye, Ryo) and the results are added to the even and odd target register (Rte, Rto) prior to storing the results in (Rte, Rto).

The BFLYS instruction 800: Results of a butterfly operation consisting of a sum and a difference of source registers Rx and Ry are stored in odd/even target register pair Rto∥Rte. Saturated arithmetic is performed such that if a result does not fit within the target format, it is clipped to a minimum or maximum as necessary.

The ADD instruction 900: The sum of source registers Rx and Ry is stored in target register Rt. Multiple packed data type operations are defined in syntax/operation table 910.

The PERM instruction 1000: Bytes from the source register pair Rxo∥Rxe are placed into the target register Rl or Rto∥Rte based on corresponding 4-bit indices in permute control word Ry. FIGS. 10C, 10D, and 10E depict three exemplary operations 1020, 1030, and 1040 of this instruction.

The PEXCHG instruction 1100: A PE's target register receives data from its input port. FIG. 11C illustrates a 2×2 cluster switch diagram 1110 and four PEs 1112, 1114, 1116 and 1118 arranged in a 2×2 array. The PE's source register is made available on its output port. The PE's input and output ports are connected to a cluster switch 1120 as depicted in FIG. 11C. The cluster switch is made up of multiplexers 1122, 1124, 1126 and 1128 (muxes), whose switching is controlled by individual PEs. The combination of the PeXchgCSctrl and the PE's ID controls the PE's mux in the cluster switch. The PEXCHG table specifies how the muxes are controlled as illustrated in the key to PEXCHG 2×2 operation table 1140 shown in FIG. 11D. Each PE's mux control, in conjunction with its partner's mux control, determines how the specified source data is routed to the PE's input port. Each PE also contains a 4-bit hardware physical identification (PID) stored in a special purpose PID register. The 2×2 array uses two bits of the PID. The PID of a PE is unique and never changes. Each PE can take an identity associated with a virtual organization of PEs. This virtual ID (VID) consists of a Gray encoded row and column value. For the allowed virtual organization of PEs 1150, shown in FIG. 11H, the last 2 digits of the VID match the last 2 digits of the PID. Tables 1160, 1170 and 1180 of FIGS. 11E, 11F and 11G, respectively, show the control settings for a 1×1, 1×2, and a 2×2 configuration of PEs, respectively.

The LMX instruction 1200: Loads a byte, halfword, word, or doubleword operand into an SP target register from SP memory or into a PE target register from PE local memory. Even address register Ae contains a 32-bit base address of a memory buffer. The high halfword of odd address register Ao contains an unsigned 16-bit value representing the memory buffer size in bytes. This value is the modulo value. The low halfword of Ao is an unsigned 16-bit index loaded into the buffer. The index value is updated prior to (pre-decrement) or after (post-increment) its use in forming the operand effective address. A pre-decrement update involves subtracting the unsigned 7-bit update value UPDATE7 scaled by the size of the operand being loaded (i.e. no scale for a byte, 2 for a halfword, 4 for a word, or 8 for a doubleword) from the index. If the resulting index becomes negative, the modulo value is added to the index. A post-increment update involves adding the scaled UPDATE7 to the index. If the resulting index is greater than or equal to the memory buffer size (modulo value), the memory buffer size is subtracted from the index. The effect of the index update is that the index moves a scaled UPDATE7 bytes forward or backward within the memory buffer. The operand effective address is the sum of the base address and the index. Byte and halfword operands can be sign-extended to 32-bits.

An alternate implementation of the 8×8 2D IDCT of the present invention that is scalable so that it is operable on arrays of different numbers of PEs, such as 1×0, 1×1, 1×2, 2×2, 2×3, and so on, is described below. This alternate approach makes efficient use of the SUM2PA ManArray instructions as well as the indirect VLIW architecture. FIG. 14 is a logical representation 1400 in two-dimensional form of the 8×8 IDCT input data, F $i_w,j_z$, as required for this scalable approach. The ordering shown maintains a relationship of the rows and columns given by the following formula that allows the reuse of the VLIWs and cosine coefficient table without modification for each dimension (rows or columns). By reuse of the VLIWs, the VIM memory is minimized and by common use of the cosine coefficient tables, the local PE data memory is minimized. The relationship between the different matrix elements as shown in FIG. 14 is specified as follows:

Where a selected subscript "$i_w$" is even or odd, and
If $i_w$ is even then
$j_z$ is odd,
matrix elements $x_a$, $x_b$, $x_c$, $x_d$ are non-repeating members of {0,2,4,6}, and
matrix elements $y_m$, $y_n$, $y_o$, $y_p$ are non-repeating members of { 1,3,5,7}
else
$j_z$ is even,
matrix elements $x_a$, $x_b$, $x_c$, $x_d$ are non-repeating members of {1,3,5,7}, and matrix elements $y_m$, $y_n$, $y_o$, $y_p$ are non-repeating members of {0,2,4,6}.

For this approach, four 16-bit values are loaded into the CRF by use of a double-word load instruction. In the current implementation of the ManArray™ architecture termed Manta™ which has a fixed endianess ordering for memory accesses the values are loaded "reverse-order" into a register pair. For example, the four memory values:

{F $x_a,x_a$, F $x_a,x_b$, F $x_a,x_c$, F $x_a,x_d$} are loaded into a register pair as:

{ F $x_a,x_d$, F $x_a,x_c$, F $x_a,x_b$, F $x_a,x_a$}.

Note that if the endianess of a processor core changes, the only change needed to the process is the arrangement of the cosine coefficients in the static table stored in memory. The orderings of $x_a$, $x_b$, $x_c$, $x_d$ and $y_m$, $y_n$, $y_o$, $y_p$ will determine the ordering of the static cosine coefficient table. The groupings of even and odd indices allow efficient use of the SUM2PA instruction in the ManArray architecture. The outputs are determined by the internal workings of the algorithm itself and are in the subscript order 0,1,2,3,4,5,6,7.

FIG. 15 illustrates the intermediate output table 1500 after the completion of the first dimension of processing. Note that the input row I $x_a$, $j_z$ ($x_a$ subscripts are common across the first row) is processed and stored in a transpose position as column I $x_a$, $j_z$ in FIG. 15 ($x_a$ subscripts are common across the first column). Likewise row I $x_b$, $j_z$ ($x_b$ subscripts are common across the second row) is processed and stored in column I $x_b$, $j_z$ in FIG. 15 ($x_b$ subscripts are common across the second column), etc. The post-increment/decrement feature of the LII instruction allow for easy and efficient address generation supporting the stores to memory in the specified memory organization.

During the second pass through the array, the incoming rows are again processed and stored in the transpose positions as columns. The result is a complete 8×8 2D IDCT stored in row-major order. The logical matrix organization of the pixel results, $P_{ij}$, is shown in table 1600 of FIG. 16. In the present implementation, the output is in 16-bit format. However, if it is known that the output values can be represented as 8-bit values, the code can be modified to store 8-bit data elements instead of 16-bit data elements.

Since the 8×8 IDCT is linearly separable, the code for a 1×8 IDCT is shown in table 1700 of FIG. 17, and then expanded into the full 8×8 IDCT, code listings 1800, 1805, 1810, 1815, 1820, 1825, 1830, 1835, 1840, 1845, 1850, 1855 and 1860 of FIGS. 18A–M, respectively.

In the code table 1700 for a 1×8 IDCT, FIG. 17, note that A0 holds the address of the incoming data that has been properly arranged, A1 holds the address of the cosine coefficient table, and A2 holds the address of the output data. R30 holds a special rounding value (where needed, 0 otherwise). R26 holds the permute control word (value 0x32107654). All incoming and outgoing values are 16-bit signed data. Internal working values use 16- and 32-bit signed data types.

The special ordering of the input data can be incorporated as part of a de-zigzag scan ordering in a video decompression scheme (e.g. MPEG-1, MPEG-2, H.263, etc.). The output data is in row-major order. The 1×8 code for any row in FIG. 17 will output values 0, 1, 2, 3, 4, 5, 6, and 7. The incoming data is loaded into registers R0–R3 of a processing element's CRF, packing two data values in each register, as follows:

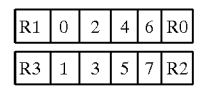

The construction of the complete 2D 8×8 IDCT is accomplished by performing a series of 8 1×8 IDCTs on the rows in a pipelined fashion, storing the output values in a second memory storage area in transpose format, performing a second series of 8 1×8 IDCTs on the rows of the transposed array (these are the columns of the original data), then storing the output values in a new storage area in transposed format. Exemplary ManArray 2D 8×8 IDCT code is shown in FIGS. 18 A–M. The scalable algorithm uses four additional instructions. FIG. 19A shows a load indirect with scaled immediate update (LII) instruction 1900 and FIG. 19B shows a syntax operation table 1910 for the LII instruction 1900 of FIG. 19A. LII instruction 1900 loads a byte, halfword, word, or doubleword operand into an SP target register from SP memory or into a PE target register from PE local memory. Source address register An is updated prior to (pre-decrement/pre-increment) or after (post-decrement/post-increment) its use as the operand effective address. The update to An is an addition or subtraction of the unsigned 7-bit update value UPDATE 7 scaled by the size of the operand being loaded. In other words, no scale for a byte, 2 for a halfword, 4 for a word, or 8 for a doubleword. Byte and halfword operands can be sign-extended to 32-bits.

FIG. 20A shows a subtract (SUB) instruction 2000 and FIG. 20B shows a syntax operation table 2010 for the SUB instruction 2000 of FIG. 20A. Utilizing SUB instruction 2000, the difference of source register Rx and Ry stored in target register Rt.

FIG. 21A shows a shift right immediate (SHRI) instruction 2100, and FIG. 21B shows a syntax/operation table 2110 for the SHRI instruction 2100 of FIG. 21A. Utilizing instruction 2100, each source register element is shifted right by the specified number of bits Nbits. The range of Nbits is 1–32. For signed (arithmetic) shifts, vacated bit positions are filled with the value of the most significant bit of the element. For unsigned (logical) shifts, vacated bit positions are filled with zeroes. Each result is copied to the corresponding target register element.

FIG. 22A illustrates a store indirect with scaled immediate update (SII) instruction 2200, and FIG. 22B shows a syntax/operation table 2210 for the SII instruction 2200 of FIG. 22A. SII instruction 2200 stores a byte, halfword, word, or doubleword operand to SP memory from an SP source register or to PE local memory from a PE source register. Source address register An is updated prior to (pre-decrement/pre-increment) or after (post-decrement/post-increment) its use as the operand effective address. The update to An is an addition or subtract of the unsigned 7-bit update value UPDATE7 scaled by the size of the operand being loaded. In other words, no scaleing is done for a byte, 2 for a halfword, 4 for a word, or 8 for a doubleword.

To realize the storage of the transpose values, the storage instructions of the 1×8 IDCT code table 1700 of FIG. 17, are modified as shown in code table 2300 of FIG. 23. Note the storage offsets in the SII instructions. The "+8" updates the address pointer so that an element is stored in the transpose format. The "−55" resets the address pointer to the beginning of the next column.

After the 8 rows of the first dimension are completed, the intermediate output is stored in transpose format. A0 is loaded with the address of the intermediate data, A1 is loaded with the start of the cosine coefficient table again, and A2 is loaded with the address of the final output data's destination. R30 is again loaded with either the rounding constant or 0. R26 is loaded with the permute control word (0x32107654).

By pipelining the rows (then the columns) a portion of the code, FIGS. 18D–M, is shown in FIG. 23 for a sample set of VLIWs progressing through rows of the 8×8, i.e. 1×8 IDCTs in succession. Entry 2302 indicates the start of next row processing and entry 2304 indicates the finish of the previous row processing. The VLIW number (VIM address) and the execution slot enable controls, #,E=execution unit, are given in a first column 2310. First shown are the VLIW loads (VIM intialization), FIGS. 18A–C, then the actual execution code for the first dimension, FIGS. 18D–H and then the code for the processing of the second dimension, FIGS. 18I–M. The final output is stored in row major order at location specified by output_buffer. The total cycle count is 202 cycles for a single 2D 8×8 IDCT.

It is noted that while this version of the IDCT is not as fast as the 34-cycle IDCT on a 2×2, there are several differences and advantages. First, it is scalable. That is, the scalable algorithm runs on a single processing element. In the code discussed above, the IDCT runs on a single SP. On a ManArray 2×2, four 8×8 IDCTs can be performed at once. Thus, the effective cycle count is about 50 cycles per IDCT, as the 202 cycles are divided by the total number of PEs. If a 2×4 array were to be used for video decompression, the effective cycle count would be only 25 cycles. These improvements are made without any change to the process and minimum change to the code. For example, for the exemplary code given in FIGS. 17–23, the .s is changed to a .p meaning the .p instructions are to be executed in the PEs. In addition, the cosine coefficients, a relatively small table, are replicated in each PE's local memory and the 8×8 data for each locally computed 8×8 2D IDCT is stored in each local PE memory. After the data is distributed, the process is then run in SIMD mode on an array of PEs.

Second, the output of each IDCT is in row-major order. No further data manipulation is required as in the 34-cycle version. While the cycle count for this IDCT is slightly higher, the effective throughput of a video decompression engine is reduced.

Third, the VIM resources for this process are less. By using a more regular pattern, this approach uses only 11 VLIW locations instead of the 27 required for the 34-cycle version.

Further optimization of the cycle count may be possible with this approach, but could result in a corresponding increase in other areas, such as VIM size for example.

While the present invention has been disclosed in a presently preferred context, it will be recognized that the present teachings may be adapted to a variety of contexts consistent with this disclosure and the claims that follow. By way of example, while the present invention is principally disclosed in the context of specific IDCT implementations, it will be recognized that the present teachings can be applied to more effective implementations of variety of cosine transforms, such as discrete cosine transforms (DCTs), for example. As one example of such an implementation, FIG. 24 shows an exemplary process 2400 for a 2×2 DCT implementation expected to take 35 cycles to run. The illustrated process 2400 starts with input data already loaded on the PEs of a 2×2 array such as that of FIG. 1. It ends with the data across the 2×2 array, but not in row-major order. Actual coding and testing of the process has not been completed and various adaptations and adjustments should be expected to optimize the final process for a desired end application.

We claim:

1. A method for efficiently computing a two dimensional inverse discrete cosine transform (IDCT) for a two dimensional data matrix comprising:

distributing the row and column data for said matrix into processing element configurable compute register files for a plurality of processing elements (PEs) in a manner so as to allow fast execution by minimizing communication operations between the PEs, wherein the plurality of PEs comprises a 2×2 array of PEs, wherein the organization of the distributed data is obtained by translating a row-major data matrix into a form prescribed by a cosine transform signal flow graph, wherein the matrix translation further comprises:

reordering a row-major data matrix by grouping odd and even data elements together;

then folding the reordered matrix on a vertical axis and on a horizontal axis; and then assigning 4×4 quadrants of the translated matrix into each of the four PEs; applying a one dimensional IDCT on all rows of said matrix; and then applying the one dimensional IDCT on all columns of said matrix to form the two dimensional IDCT.

2. The method of claim 1 wherein said step of distributing further comprises the steps of:

loading frequency coefficient data and a first set of cosine coefficients for said PEs;

initializing pointer and control values; and utilizing a rounding bit to enhance precision.

3. The method of claim 2 wherein the step of applying a one dimensional IDCT on all rows of said matrix further comprises:

performing a sum of product operation comprising thirty-two 16×16 multiplications and twenty-four 2-to-1 32-bit additions for each row to produce 32-bit sum of product data.

4. The method of claim 2 wherein the step of applying a one dimensional IDCT on all columns of said matrix further comprises:

performing a sum of product operation comprising thirty-two 16×16 multiplications and twenty-four 2-to-1 32-bit additions for each column to produce 32-bit sum of product data.

5. The method of claim 3 wherein said step of applying a one dimensional IDCT on all rows of said matrix further comprises:

performing four butterfly operations, where each butterfly operation comprises a separate add and subtract on 16-bit data.

6. The method of either claim 4 or 5 wherein said step of applying a one dimensional IDCT on all columns of said matrix further comprises:

performing four butterfly operations, where each butterfly operation comprises a separate add and subtract on 16-bit data.

7. The method of claim 5 wherein as results of initial ones of said sum of product operations are produced, said butterfly operations commence and overlap with the completion of further of said sum of product operations.

8. The method of either claim 3 or 4 further comprising the step of:
operating on the most significant 16 bits of the 32-bit sum of product data to produce a final IDCT result in 16-bit form.

9. The method of claim 1 wherein the a 2×2 array of PEs are connected in a manifold array architecture and an indirect execute very long instruction word (XV) instruction is utilized to allow a software pipeline to be built up or torn down without creating new very long instruction words (VLIWs) to support each stage of building up or tearing down a software pipeline.

10. The method of claim 1 wherein said step of distributing further comprises the steps of:
receiving from an MPEG decoder a linear order of 64 packed halfword data elements with two AC coefficients per word; and
organizing this data in packed format to match a packed format required in one of said IDCT steps.

11. The method of claim 10 further comprising the step of:
loading the data via a direct memory access (DMA).

12. The method of claim 10 further comprising the step of:
loading the data utilizing manifold array load instructions.

13. The method of claim 12 wherein the data is loaded into the processing element configurable compute register files used in a 16×64 configuration for high performance packed data operation.

14. A system for efficiently computing a two dimensional inverse discrete cosine transform (IDCT) for a two dimensional data matrix comprising:
means for distributing the row and column data for said matrix into processing element configurable compute register files for a plurality of processing elements (PEs) to allow fast execution by minimizing communication operations between the PEs wherein the plurality of PEs comprises a 2×2 array of PEs, and said means for distributing further comprises:
means for loading frequency coefficient data and a first set of cosine coefficients for said PEs;
means for initializing pointer and control values; and
means for utilizing a rounding bit to enhance precision;
means for applying a one dimensional TDCT on all rows of said matrix; and
means for applying the one dimensional IDCT on all columns of said matrix.

15. The system of claim 14 wherein the means applying a one dimensional IDCT on all rows of said matrix further comprises:
means for performing a sum of product operation comprising thirty-two 16×16 multiplications and twenty-four 2-to-1 32-bit additions for each row to produce 32-bit sum of product data.

16. The system of claim 14 wherein the means for applying a one dimensional IDCT on all columns of said matrix further comprises:
means for performing a sum of product operation comprising thirty-two 16×16 multiplications and twenty-four 2-to-1 32-bit additions for each column to produce 32-bit sum of product data.

17. The system of claim 15 wherein the means for applying a one dimensional IDCT on all rows of said matrix further comprises:
means for performing four butterfly operations, where each butterfly operation comprises a separate add and subtract on 16-bit data.

18. The system of either claim 16 or 17 wherein said means for applying a one dimensional IDCT on all columns of said matrix further comprises:
means for performing four butterfly operations, where each butterfly operation comprises a separate add and subtract on 16-bit data.

19. The system of claim 17 or wherein as results of initial ones of said sum of product operations are produced, said means for performing butterfly operations commence operation and said operations overlap with the completion of further of said sum of product operations.

20. The system of either claim 15 or 16 further comprising:
means for operating on the most significant 16 bits of the 32-bit sum of product data to produce a final IDCT result in 16-bit form.

21. The system of claim 5 wherein the 2×2 array of PEs are connected in a manifold array architecture and an indirect execute very long instruction word (XV) instruction is utilized to allow a software pipeline to be built up or torn down without creating new very long instruction words (VLIWs) to support each stage of building up or tearing down a software pipeline.

22. The system of claim 5 wherein said means for distributing further comprises:
means for receiving from an MPEG decoder a linear order of 64 packed halfword data elements with two AC coefficients per word; and
means for organizing this data in packed format to match a packed format required in one of said IDCT steps.

23. The system of claim 22 further comprising:
means for loading the data via a direct memory access (DMA).

24. The system of claim 22 further comprising:
means for loading the data utilizing manifold array load instructions.

25. The system of claim 24 wherein the data is loaded into the processing lement configurable compute register files configured in a 16×64 configuration for high performance packed data operation.

26. A method for efficiently computing a two dimensional inverse discrete cosine transform (IDCT) for a two dimensional data matrix comprising the steps of:
distributing the row and column data for said matrix into processing element configurable compute register files for a plurality of processing elements (PEs) in a manner so as to allow fast execution by minimizing communication operations between the PEs, the organization of the distributed data is obtained by translating a column-major data matrix into a form prescribed by a cosine transform signal flow graph, wherein the plurality of PEs comprises a 2×2 array of PEs, the matrix translation further comprises the steps of:
reordering a column-major data matrix by grouping odd and even data elements together;
then folding the reordered matrix on a vertical axis and on a horizontal axis; and
then assigning 4×4 quadrants of the translated matrix into each of the four PEs;
applying a one dimensional IDCT on all columns of said matrix; and then applying the one dimensional TDCT on all rows of said matrix to form the two dimensional IDCT.

27. The method of claim 26 wherein the plurality of PEs comprises a 2×2 array of PEs and said step of distributing further comprises the steps of:
    loading frequency coefficient data and a first set of cosine coefficients for said PEs;
    initializing pointer and control values; and
    utilizing a rounding bit to enhance precision.

28. The method of claim 27 wherein the step of applying a one dimensional IDCT on all columns of said matrix further comprises:
    performing a sum of product operation comprising thirty-two 16×16 multiplications and twenty-four 2-to-1 32-bit additions for each column to produce 32-bit sum of product data.

29. The method of claim 27 wherein the step of applying a one dimensional IDCT on all rows of said matrix further comprises:
    performing a sum of product operation comprising thirty-two 16×16 multiplications and twenty-four 2-to-1 32-bit additions for each row to produce 32-bit sum of product data.

30. The method of claim 28 wherein said step of applying a one dimensional IDCT on all columns of said matrix further comprises:
    performing four butterfly operations, where each butterfly operation comprises a separate add and subtract on 16-bit data.

31. The method of either claim 29 or 30 wherein said step of applying a one dimensional IDCT on all columns of said matrix further comprises:
    performing four butterfly operations, where each butterfly operation comprises a separate add and subtract on 16-bit data.

32. The method of either of claim 30 wherein as results of initial ones of said sum of product operations are produced, said butterfly operations commence and overlap with the completion of farther of said sum of product operations.

33. The method of either claim 28 or 29 further comprising the step of:
    operating on the most significant 16 bits of the 32-bit sum of product data to produce a final IDCT result in 16-bit form.

34. The method of claim 26 wherein the 2×2 array of PEs are connected in a manifold array architecture and an indirect execute very long instruction word (XV) instruction is utilized to allow a software pipeline to be built up or torn down without creating new very long instruction words (VLIWs) to support each stage of building upon tearing down a software pipeline.

35. The method of claim 26 wherein said step of distributing further comprises the steps of:
    receiving from an MPEG decoder a linear order of 64 packed halfword data elements with two AC coefficients per word; and
    organizing this data in packed format to match a packed format required in one of said IDCT step.

36. The method of claim 35 further comprising the step of: loading the data via a direct memory access (DMA).

37. The method of claim 35 further comprising the step of: loading the data utilizing manifold array load instructions.

38. The method of claim 37 wherein the data is loaded into the processing element configurable compute register files used in a 16×64 configuration for high performance packed data operation.

39. A scalable method for efficiently computing a two dimensional indirect discrete cosine transform (IDCT) for a two dimensional data matrix comprising the steps of:
    assigning input data $F i_w, j_z$ to positions in the two dimensional data matrix so that the relationship between different matrix elements is defined such that if $i_w$ is even, then $j_z$ is odd, matrix elements $x_a, x_b, x_c, x_d$ are non-repeating members of $\{0,2,4,6\}$, and matrix elements $y_m, y_n, y_o, y_p$ are non-repeating members of $\{1,3,5,7\}$, otherwise $i_z$ is even, matrix element $x_a, x_b, x_c, x_d$ are non-repeating members of $\{1,3,5,7\}$, and matrix elements $y_m, y_n, y_o, y_p$ are non-repeating members of $\{0,2,4,6\}$;
    processing the two dimensional data matrix to efficiently compute the two dimensional inverse discrete cosine transform; and
    loading four 16-bit values in a compute register file utilizing a double-word load instruction.

40. The method of claim 39 wherein said four 16-bit values are loaded in reverse-order in a register pair.

41. The method of claim 39 further comprising the step of storing a static cosine coefficient table in a local memory of each processing element of an array comprising multiple processing elements; and
    distributing said processing amongst said multiple processing elements.

42. The method of claim 41 further comprising the step of:
    utilizing a post-increment/decrement feature of an LII instruction in the ManArray architecture for easy and efficient address generation supporting stores to memory in a specified memory organization.

43. The method of claim 39 further comprising the step of:
    utilizing a SUM2PA instruction in the ManArray architecture to produce outputs in subscript order 0,1,2,3,4,5,6, and 7.

* * * * *